United States Patent
Herold et al.

(10) Patent No.: US 8,365,637 B2
(45) Date of Patent: Feb. 5, 2013

(54) DROP BOX FOR POWERTRAIN

(75) Inventors: Robert A. Herold, Peoria, IL (US); Nuwan Janaka Gallege, Peoria, IL (US); Dean A. Worrell, Peoria, IL (US); Robert L. Isaacs, Buffalo, MN (US); Samuel Shropshire, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1445 days.

(21) Appl. No.: 11/877,438

(22) Filed: Oct. 23, 2007

(65) Prior Publication Data
US 2009/0105036 A1 Apr. 23, 2009

(51) Int. Cl.
*F16H 57/02* (2012.01)
(52) U.S. Cl. ............... 74/665 GA; 74/665 R; 74/665 N
(58) Field of Classification Search ............ 74/655 GA, 74/665 R, 665 N; 180/247; 192/114 R, 69.9
See application file for complete search history.

(56) References Cited

U.S. PATENT DOCUMENTS

| | | | |
|---|---|---|---|
| 4,158,404 A | 6/1979 | Yamashita et al. | |
| 4,193,467 A | 3/1980 | Simmons | |
| 4,257,578 A | 3/1981 | Allen | |
| 4,267,749 A | 5/1981 | Chambers et al. | |
| 4,271,722 A * | 6/1981 | Campbell | 475/86 |
| 4,487,303 A | 12/1984 | Boueri et al. | |
| 4,494,423 A | 1/1985 | McCarthy et al. | |
| 4,527,448 A | 7/1985 | Person et al. | |
| 4,527,678 A | 7/1985 | Pierce et al. | |
| 4,541,308 A | 9/1985 | Person et al. | |
| 4,542,801 A | 9/1985 | Richards et al. | |
| 4,570,503 A | 2/1986 | Theobald | |
| 4,577,524 A | 3/1986 | Richards et al. | |
| 4,614,133 A | 9/1986 | Nerstad et al. | |
| 4,628,771 A | 12/1986 | Person et al. | |
| 4,658,673 A | 4/1987 | Nerstad et al. | |

(Continued)

FOREIGN PATENT DOCUMENTS

| CN | 2574933 | 8/2002 |
|---|---|---|
| CN | 1948789 | 11/2006 |

(Continued)

OTHER PUBLICATIONS

Beauregard et al., "Synthesis and characterization of a novel UHMWPE interpenetrating polymer network," *Biomedical Sciences Instrumentation*, 35: 415-419 (Apr. 16, 1999).

(Continued)

*Primary Examiner* — David D Le
*Assistant Examiner* — Derek D Knight
(74) *Attorney, Agent, or Firm* — Leydig, Voit & Mayer

(57) ABSTRACT

An output transfer group, or drop box, can include a housing and a gear transfer train, rotatably supported within the housing, that includes an input gear adapted for enmeshing engagement with a transmission output shaft and a gear transfer output shaft that is rotatable upon rotation of the input gear. A coupler can be provided that includes a hub rotatively coupled with the gear transfer output shaft, a bearing carrier, a coupler output shaft rotatively coupled to the bearing carrier, and a coupling mechanism rotatively coupled to the bearing carrier. The coupling mechanism can be movable between an engaged position, wherein the coupling mechanism is rotatively coupled to the hub, and a disengaged position, wherein the coupling mechanism is disengaged from the hub. A solenoid can be arranged with the coupling mechanism to selectively move the coupling mechanism from the disengaged position to the engaged position.

16 Claims, 17 Drawing Sheets

U.S. PATENT DOCUMENTS

| | | | |
|---|---|---|---|
| 4,670,508 A | 6/1987 | Ohdaira et al. | |
| 4,676,116 A | 6/1987 | Nerstad et al. | |
| 4,699,235 A * | 10/1987 | Anderson | 180/247 |
| 4,734,861 A | 3/1988 | Bertolasi et al. | |
| 4,823,639 A | 4/1989 | Krause et al. | |
| 4,919,222 A | 4/1990 | Kyrtsos et al. | |
| 5,005,663 A * | 4/1991 | Niide et al. | 180/247 |
| 5,067,572 A | 11/1991 | Kyrtsos et al. | |
| 5,070,953 A | 12/1991 | Kyrtsos et al. | |
| 5,082,071 A | 1/1992 | Kyrtsos et al. | |
| 5,127,858 A | 7/1992 | Pelligrino et al. | |
| 5,179,875 A | 1/1993 | Brown | |
| 5,183,439 A | 2/1993 | Yumoto et al. | |
| 5,233,890 A | 8/1993 | Aldrich, III et al. | |
| 5,267,636 A * | 12/1993 | Fielding | 192/53.34 |
| 5,275,838 A | 1/1994 | Merrill | |
| 5,303,616 A | 4/1994 | Palansky et al. | |
| 5,379,857 A | 1/1995 | Niederhofer | |
| 5,393,012 A | 2/1995 | Dunn | |
| 5,471,147 A | 11/1995 | Allen et al. | |
| 5,474,506 A | 12/1995 | Palansky et al. | |
| 5,502,770 A | 3/1996 | Kuo et al. | |
| 5,509,520 A | 4/1996 | Evans et al. | |
| 5,522,777 A | 6/1996 | Baxter et al. | |
| 5,603,241 A | 2/1997 | Umeyama | |
| 5,607,205 A | 3/1997 | Burdick et al. | |
| 5,647,439 A | 7/1997 | Burdick et al. | |
| 5,699,870 A | 12/1997 | Warren | |
| 5,704,427 A | 1/1998 | Buck et al. | |
| 5,707,202 A | 1/1998 | Brown | |
| 5,724,865 A | 3/1998 | Boone | |
| 5,931,255 A | 8/1999 | Sewell | |
| 6,016,459 A | 1/2000 | Isaac et al. | |
| 6,125,961 A * | 10/2000 | Matsufuji | 180/233 |
| 6,139,458 A | 10/2000 | Simmons | |
| 6,161,643 A | 12/2000 | Bober et al. | |
| 6,299,565 B1 | 10/2001 | Jain et al. | |
| 6,447,418 B1 | 9/2002 | Fleytman | |
| 6,579,208 B2 | 6/2003 | Oliveira et al. | |
| 6,631,779 B2 | 10/2003 | Watson et al. | |
| 6,692,395 B2 | 2/2004 | Rodeghiero et al. | |
| 6,818,172 B2 | 11/2004 | King et al. | |
| 6,868,906 B1 | 3/2005 | Vail, III et al. | |
| 6,904,994 B2 | 6/2005 | Coutant et al. | |
| 6,954,719 B2 | 10/2005 | Carter, Jr. et al. | |
| 7,006,920 B2 | 2/2006 | Newman et al. | |
| 7,029,422 B2 | 4/2006 | Newman et al. | |
| 7,036,610 B1 | 5/2006 | Vail, III | |
| 7,165,634 B2 | 1/2007 | Vail, III | |
| 2002/0125614 A1 | 9/2002 | King et al. | |
| 2003/0083433 A1 | 5/2003 | James et al. | |
| 2003/0125513 A1 | 7/2003 | King | |
| 2003/0144741 A1 | 7/2003 | King et al. | |
| 2003/0144742 A1 | 7/2003 | King et al. | |
| 2003/0196865 A1 * | 10/2003 | Lim | 192/84.92 |
| 2004/0162658 A1 | 8/2004 | Newman | |
| 2004/0210316 A1 | 10/2004 | King et al. | |
| 2004/0262809 A1 | 12/2004 | Smith et al. | |
| 2005/0060127 A1 | 3/2005 | Carter, Jr. et al. | |
| 2005/0065307 A1 | 3/2005 | King et al. | |
| 2006/0004168 A1 | 1/2006 | Greer et al. | |
| 2006/0131023 A1 | 6/2006 | Jacklin | |
| 2006/0149387 A1 | 7/2006 | Smith et al. | |
| 2006/0149388 A1 | 7/2006 | Smith et al. | |
| 2006/0163545 A1 | 7/2006 | Newman | |

FOREIGN PATENT DOCUMENTS

| | | |
|---|---|---|
| DE | 227 328 A1 | 9/1985 |
| JP | 5989230 | 5/1984 |
| RU | 2248891 | 7/2003 |
| WO | WO 93/25247 A1 | 12/1993 |

OTHER PUBLICATIONS

Kurtz et al., "Advanced in the processing, sterilization, and crosslinking of ultra-high molecular weight polyethylene for total joint arthroplasty," *Biomaterials*, 20 (18): 1659-1688 (1999).

Caterpillar Inc., OEM Solutions Group, "TH31-E61 with integral drop box: specifications," Publication No. WEHW1004-01 (2006).

Caterpillar Inc., OEM Solutions Group, "TH35-E81 with integral drop box: specifications," Publication No. WEHW1005-01 (2006).

* cited by examiner

DROP BOX FOR POWERTRAIN

TECHNICAL FIELD

This patent disclosure relates generally to a powertrain and, more particularly to a powertrain for a well service rig having an engine transmission power module and an output transfer group.

BACKGROUND

Well service rigs can be used for a variety of tasks at oil and gas well sites, including, for example, swabbing, installing, and pulling a tube and sucker rod via large, chassis-mounted draw works. The well service rig can include a powertrain having an engine and a transmission that both provides propulsion to the vehicle drive line as well as driving the winches of the draw works. Downstream of the transmission, an output transfer gear group, or drop box, can be provided to couple and decouple the two drive lines from the engine-transmission power module. Existing drop boxes have been controlled by manually operating couplers to couple/decouple the drive lines. Control of the drop box can be difficult, leading to situations where the drop box and the transmission can be operated inefficiently and/or damaged.

SUMMARY

The disclosure describes, in one aspect, an output transfer gear group, i.e. a drop box, including a housing and a gear transfer train rotatably supported within the housing. The gear transfer train can include an input gear adapted for enmeshing engagement with a transmission output shaft and a gear transfer output shaft which is rotatable upon rotation of the input gear. A coupler can be provided that includes a hub rotatably coupled with a distal end of the gear transfer output shaft, a bearing carrier, a coupler output shaft supported within the bearing carrier and rotatively coupled thereto, and a coupling mechanism rotatively coupled to the bearing carrier. The coupling mechanism can be movable between an engaged position, wherein the coupling mechanism is rotatively coupled to the hub such that rotation of the hub rotates the bearing carrier and the coupler output shaft, and a disengaged position, wherein the coupling mechanism is disengaged from the hub. A solenoid can be arranged with the coupling mechanism to selectively move the coupling mechanism from the disengaged position to the engaged position.

In another aspect, a coupler for an output transfer gear group can be provided that includes a hub adapted for rotative coupling with an output shaft, a bearing carrier, a coupler output shaft supported within the bearing carrier and rotatively coupled thereto, and a coupling mechanism rotatively coupled to the bearing carrier. The coupling mechanism can be movable between an engaged position, wherein the coupling mechanism is rotatively coupled to the hub such that rotation of the hub rotates the bearing carrier and the coupler output shaft, and a disengaged position, wherein the coupling mechanism is disengaged from the hub. A solenoid can be arranged with the coupling mechanism to selectively move the coupling mechanism from the disengaged position to the engaged position.

In yet another aspect of the disclosure, a controller for an output transfer gear group can be provided. The output transfer group can be operably connected to a transmission which includes at least a neutral position, a forward drive position, and a park position. The output transfer gear group can include first and second couplers associated with first and second drive lines, respectively, for selectively coupling the transmission to the first and second drive lines. The controller can include a computer readable program code embodied therein for receiving a signal from a user to engage the first coupler, signaling the transmission to shift to the park position, signaling the output transfer gear group to disengage the second coupler, sensing the position of the second coupler to determine the second coupler is disengaged, signaling the output transfer gear group to engage the first coupler, and sensing the position of the first coupler to determine the first coupler is engaged.

DETAILED DESCRIPTION

Figure 1:
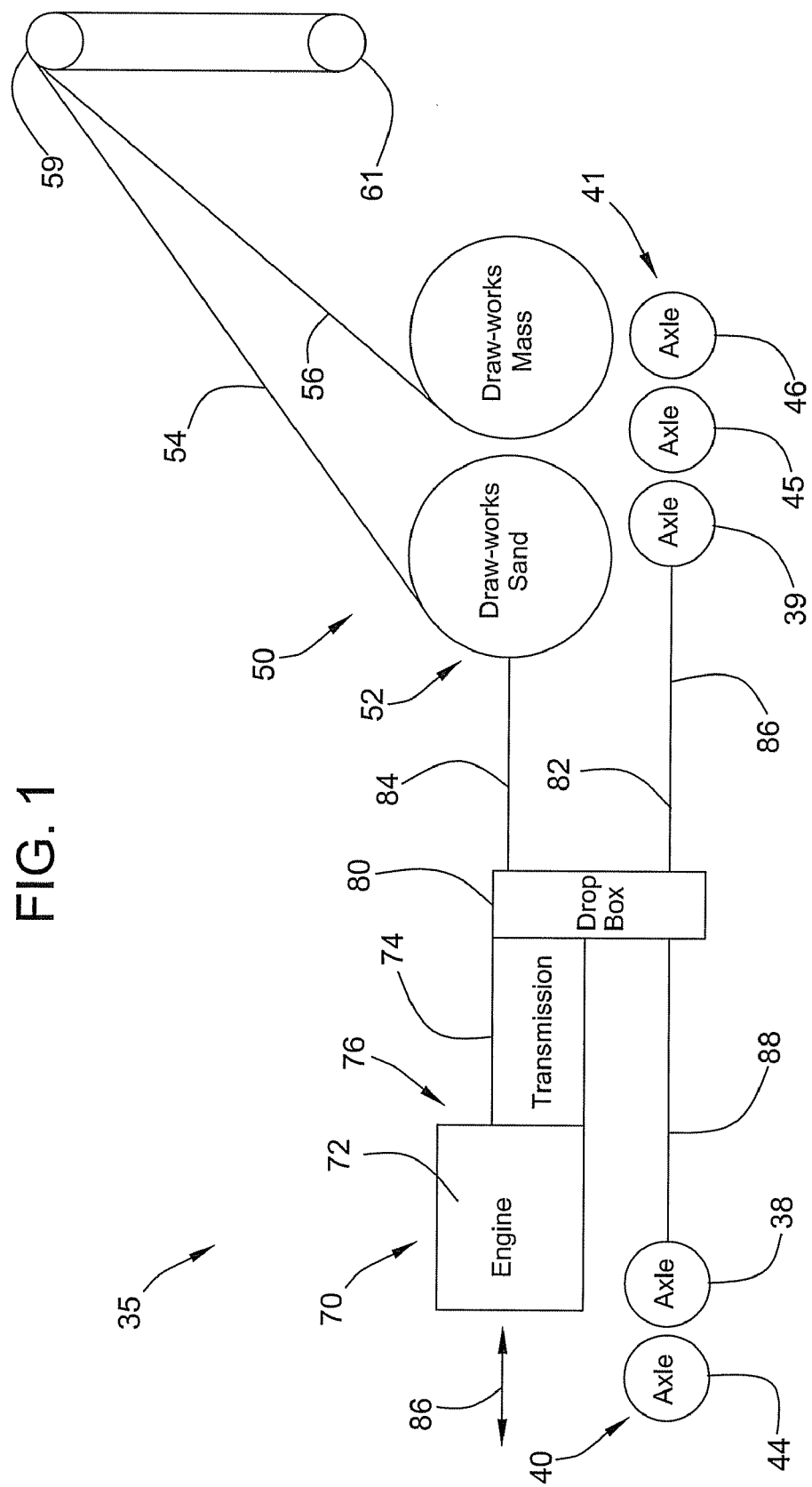
FIG. 1 is a diagrammatic view of a powertrain of a well service rig.

Turning now to the Figures, in one embodiment, a well service rig 35 can be supported for movement along the ground or any suitable support surface by at least a pair of tire and axle assemblies 38, 39 that are mounted to the respective front and rear portions 40, 41 of a frame of the rig 35. In the illustrated embodiment, the well service rig 35 includes a pair of front tire and axle assemblies 38, 44 and three rear tire and axle assemblies 39, 45, 46. At least one tire can be mounted on each end of the axle of each tire and axle assembly 38, 39, 44, 45, 46.

The frame of the rig 35 can support a draw works assembly 50. The draw works assembly 50 can include a winch 52 for selectively operating a sand line 54 and a main line 56. A telescoping mast can be provided that is outfitted with a mast pulley 59 at its distal end, over which the sand line 54 and the main line 56 extend, and that supports a block and tackle 61 therefrom. The telescoping mast can also support one or more baskets therefrom, such as, a rod basket and a tube basket, for example. The frame of the rig 35 can also support other conventional equipment for servicing a well, such as a working platform and a plurality of jacks, for example. The jacks can be hydraulically-operated and operable to support the well service rig 35 such that the tire and axle assemblies 38, 39, 44, 45, 46 are elevated from the surface upon which the well service rig 35 rests when the well service rig 35 is in a well-servicing mode.

The frame can further support in a conventional manner a powertrain 70 for selectively providing driving rotation to at least one of the tire and axle assemblies 38, 39, 44, 45, 46 or to the draw works assembly 50. The powertrain 70 can include an engine 72, a transmission 74 mounted to the engine to comprise an engine-transmission power module 76 and an output transfer gear group, i.e., a drop box 80 mounted to the transmission 74.

The engine-transmission power module 76 can be any suitable power module known in the art. For example, in one embodiment, the transmission can include eight forward gears and one reverse gear, a neutral position, a non-clutch neutral position, and a park position. When the transmission is in the neutral position, the non-clutch neutral position, or the park position, the transmission output shaft does not rotate even though the engine may be running. The eight forward gears can each have a different gear ratio to generate different transmission output shaft speed ratios. In other embodiments, the transmission can include a different number of forward gears, such as six, for example.

The drop box 80 can be disposed downstream of the transmission 74 and can be integral therewith. The drop box 80 can provide propulsion to the rig 35 via a vehicle drive line 82 and drive the draw works assembly 50 via a draw works drive line 84. The drop box 80 can selectively couple and decouple the vehicle drive line 82 and the draw works drive line 84 from the engine-transmission power module 76.

When the drop box 80 is in a drive mode, the vehicle drive line 82 is coupled to the engine-transmission power module 76, and the draw works drive line 84 is decoupled therefrom. The drop box 80 can allow for the placement of the vehicle drive line 82 in a vertically offset relationship with respect to a longitudinal axis 86 of the engine-transmission power module 76. The vehicle drive line 82 can include a rear portion 86 for providing driving rotation to one of the rear tire and axle assemblies 39 and a front portion 88 for providing driving rotation to one of the front tire and axle assemblies 38. As explained below, the drop box 80 can be configured such that the vehicle drive line 82 can be used to drive only one of the rear tire and axle assemblies 39. When the drop box 80 is in a well-service mode, the draw works drive line 84 is coupled to the engine-transmission power module 76, and the vehicle drive line 82 is decoupled therefrom.

Figure 2:
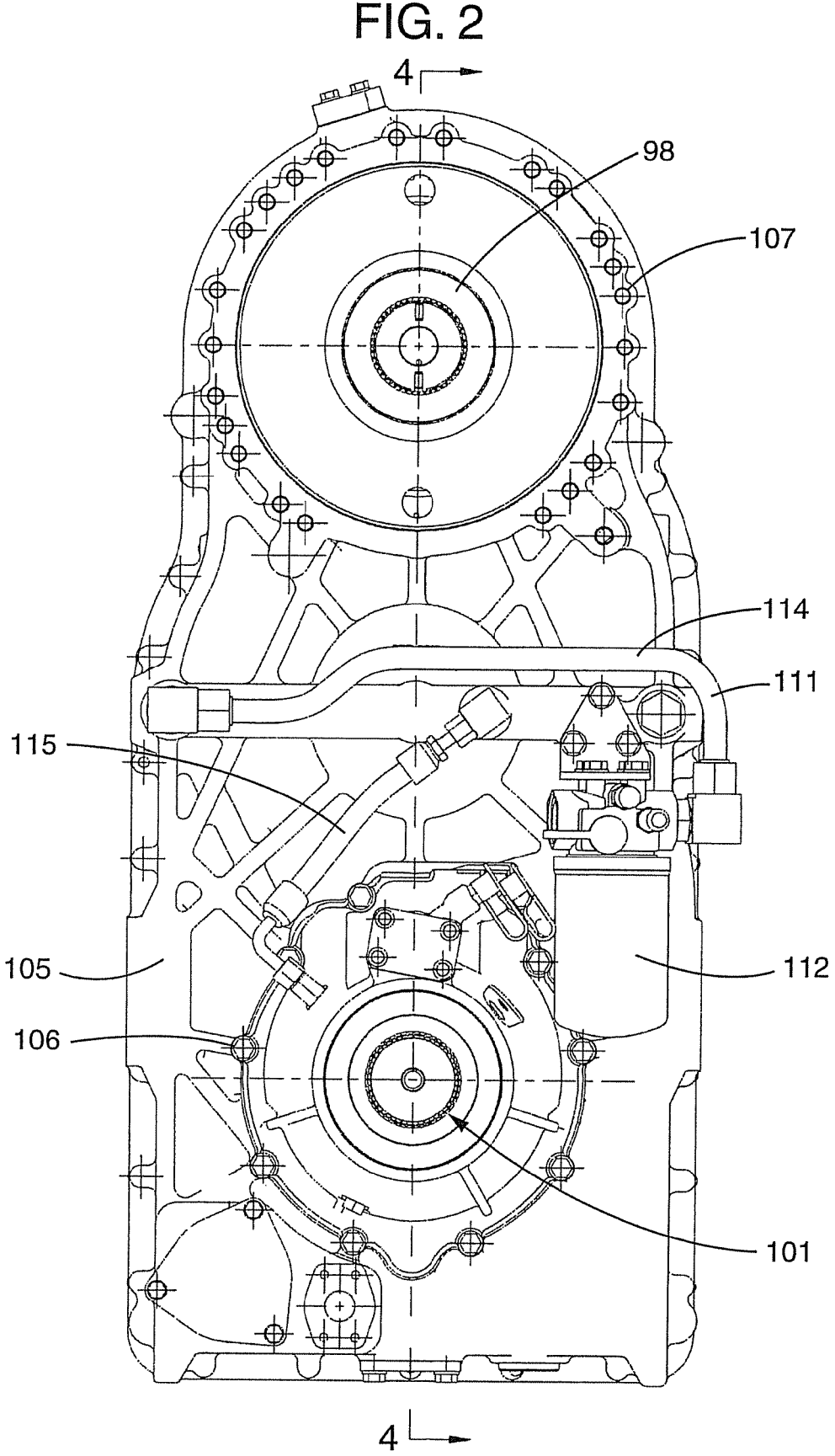
FIG. 2 is a front elevational view of a drop box for use in the powertrain of FIG. 1.
Figure 3:
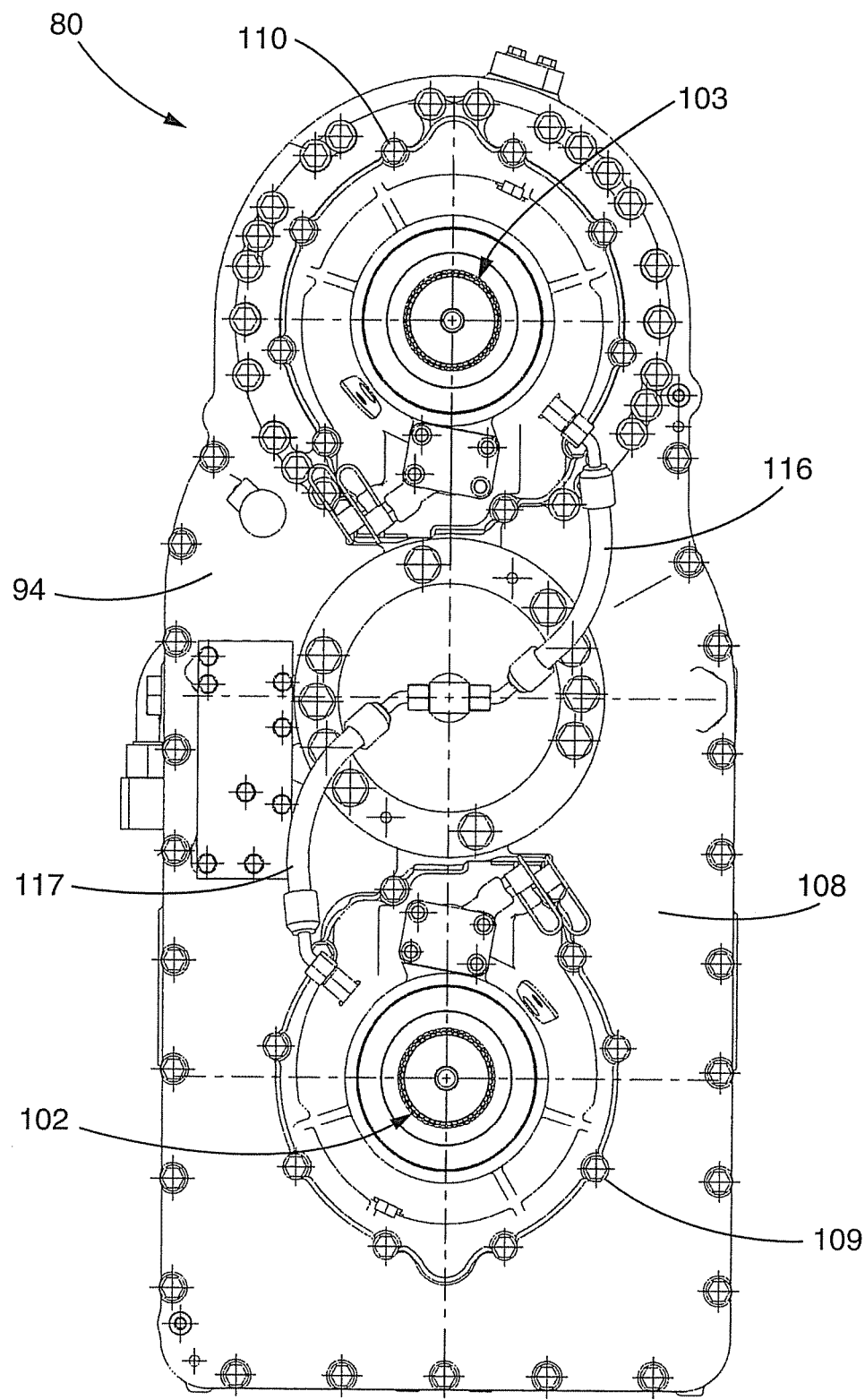
FIG. 3 is a rear elevational view of the drop box of FIG. 2.

Referring to FIGS. 2 and 3, the drop box 80 can include a housing 94 that defines an input port 98 through which an output shaft of the transmission extends for rotatively coupling to a gear transfer train 99 (FIG. 4) rotatably supported within the housing 94. The housing 94 supports three couplers 101, 102, 103 that are each rotatively coupled to either the vehicle drive line 82 or the draw works drive line 84 and selectively rotatively coupled to the gear transfer train 99.

Referring to FIG. 2, the input port 98 and the front vehicle coupler 101 are disposed on a front side 105 of the housing 94. The front vehicle coupler 101 can be mounted to the housing 94 via a plurality of mounting bolts 106, for example, as shown. A plurality of mounting bolts 107 can also be provided about the input port 98 for mounting the drop box 80 to the transmission.

The front vehicle coupler 101 is disposed vertically below the input port 98. The front vehicle coupler 101 is rotatively coupled to the front portion 88 of the vehicle drive line 82 (FIG. 1) and selectively interengaged with the gear transfer train 99 disposed within the housing 94 such that, when the gear transfer train 99 and the front vehicle coupler 101 are interengaged, rotation of the gear transfer train 99 rotates the front vehicle coupler 101.

Referring to FIG. 3, the rear vehicle coupler 102 and the draw works coupler 103 are disposed on a rear side 108 of the housing 94. The rear vehicle and draw works couplers 102, 103 can be mounted to the housing 94 via a respective plurality of mounting bolts 109, 110. The rear vehicle coupler 102 is substantially aligned with the front vehicle coupler 101, and the draw works coupler 103 is substantially aligned with the input port 98 disposed on the front side 105 thereof.

The rear vehicle coupler 102 is rotatively coupled to the rear portion 86 of the vehicle drive line 82 (FIG. 1) and selectively coupled to the gear transfer train 99 disposed within the housing 94 such that when the gear transfer train 99 and the rear vehicle coupler 102 are interengaged, rotation of the gear transfer train 99 rotates the rear vehicle coupler 102 for driving the rear portion 86 of the vehicle drive line 82. The draw works coupler 103 is rotatively coupled to the draw works drive line 84 (FIG. 1) and selectively rotatively coupled to the gear transfer train 99 disposed within the housing 94 of the drop box. When the gear transfer train 99 and the draw works coupler 103 are interengaged, rotation of the gear transfer train 99 rotates the draw works coupler 103 for driving the draw works drive line 84.

Referring to FIGS. 2 and 3, the drop box 80 includes a hydraulic circuit 111 having a filter 112 and a plurality of lines 114, 115, 116, 117. The hydraulic circuit 111 can be used for hydraulic connection of the couplers 101, 102, 103 and the gear transfer train 99 to a source of lubricant.

Figure 4:
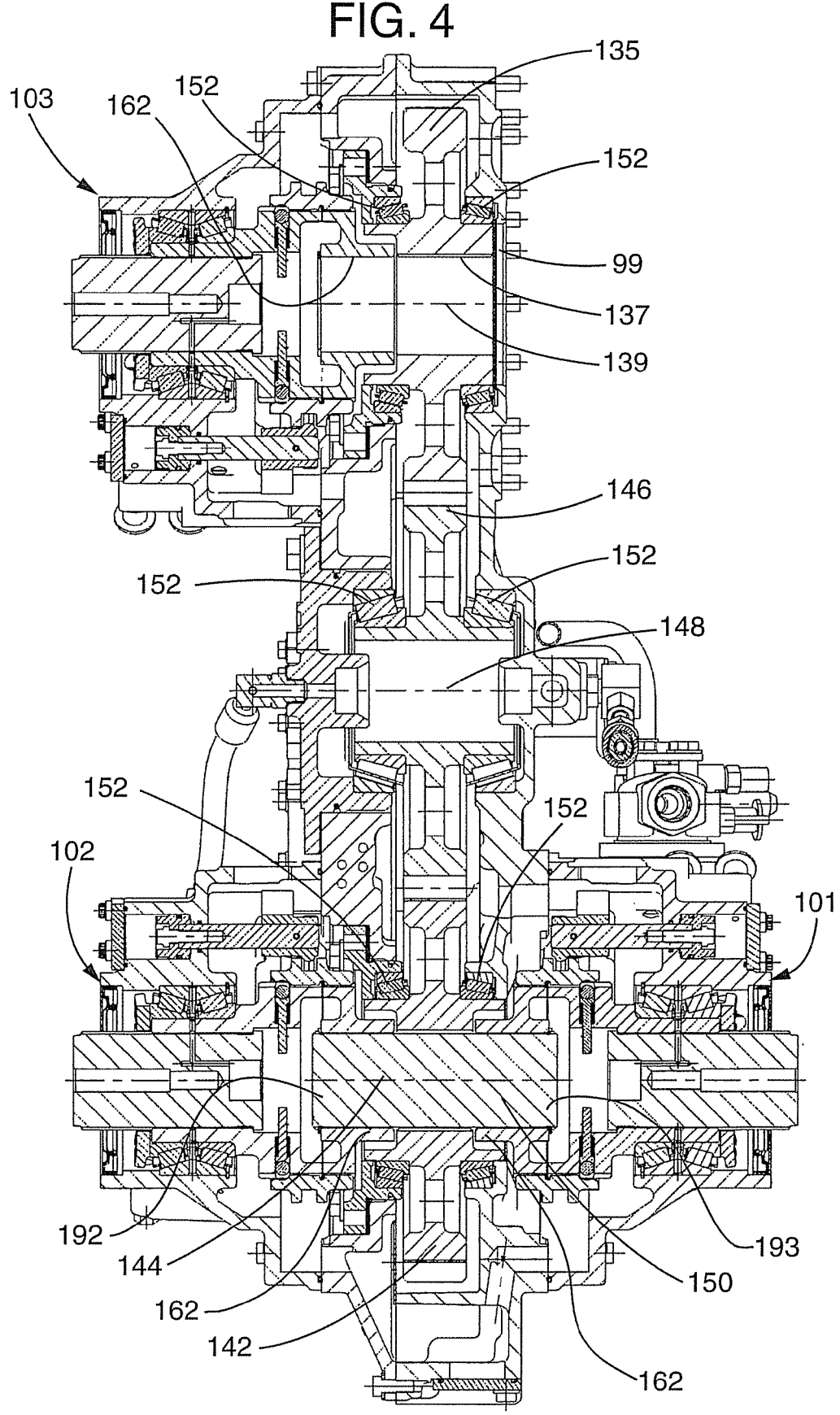
FIG. 4 is a cross-sectional view taken along line 4-4 in FIG. 2.

Referring to FIG. 4, the transmission output shaft drives the gear transfer train 99. The gear transfer train 99 is journaled for rotational, interengaged movement and can include an input gear 135 that is operably arranged with the output shaft of the transmission for rotational movement thereof. The input gear 135 is adapted for enmeshing engagement with the transmission output shaft. The input gear 135 can include an internal gear surface 137 that is enmeshed with an external gear surface of the output shaft of the transmission. The input gear 135 is rotatable about a first longitudinally-extending axis 139.

The gear transfer train 99 includes an output gear 142 rotatable about a second-longitudinally extending axis 144 and a transfer or idler gear 146 rotatable about a third longitudinally-extending axis 148 for connecting and transferring power between the input and the output gears 135, 142. Each gear 135, 146, 142 is mounted on a split-tapered roller bearing assembly 152 to facilitate the rotation of the gear about its respective longitudinally-extending axis 139, 148, 144. The input gear 135 is enmeshed with the idler gear 146, which, in turn, is enmeshed with the output gear 142. The output gear 142 is arranged such that rotation of the idler gear 146 rotates the output gear 142.

A gear train output shaft 150 is rotatively coupled to the output gear 142, via a splined connection, for example, for rotational movement thereof about the second longitudinal axis 144. The gear transfer output shaft 150 is rotatively coupled to the output gear 142. The gear train output shaft 150 rotates upon rotation of the input gear 135 via the enmeshing engagement of the input gear 135, the idler gear 146, and the output gear 142.

Referring to FIG. 4, in one embodiment, to engage the rear vehicle coupler 102 to the gear transfer train 99, the draw works coupler 103 is first disengaged therefrom. In one embodiment, the front vehicle coupler 101 is only engageable to the gear transfer train 99 while the rear vehicle coupler 102 is engaged thereto. In one embodiment, to engage the draw works coupler 13 to the gear transfer train 99, the front and rear vehicle couplers 101, 102 are first disengaged therefrom. In other embodiments, the couplers can be engaged and disengaged in other sequences.

Each coupler 101, 102, 103 is substantially the same. Accordingly, it should be understood that the description of one coupler is applicable to the other couplers, as well.

Referring to FIGS. 5-8, the coupler 102 can include a housing 160 which contains a hub 162 for rotational interengagement with an output shaft of either the transmission or the gear transfer train, a bearing carrier 164, a coupler output shaft 166 supported within the bearing carrier 164 and rotatively coupled thereto, and a coupling mechanism 168 for selectively coupling the bearing carrier 164 to the hub 162. The bearing carrier 164 is rotatably supported within the coupler housing 160. The coupling mechanism 168 is rotatively coupled to the bearing carrier 164. The coupling mechanism is movable between an engaged position, wherein the coupling mechanism 168 is rotatively coupled to the hub 162 such that rotation of the hub 162 rotates the bearing carrier 164 and the coupler output shaft 166, and a disengaged position, wherein the coupling mechanism 168 is disengaged from the hub 162 such that the hub 162 is free to rotate with respect to the coupling mechanism 168.

Figure 8:
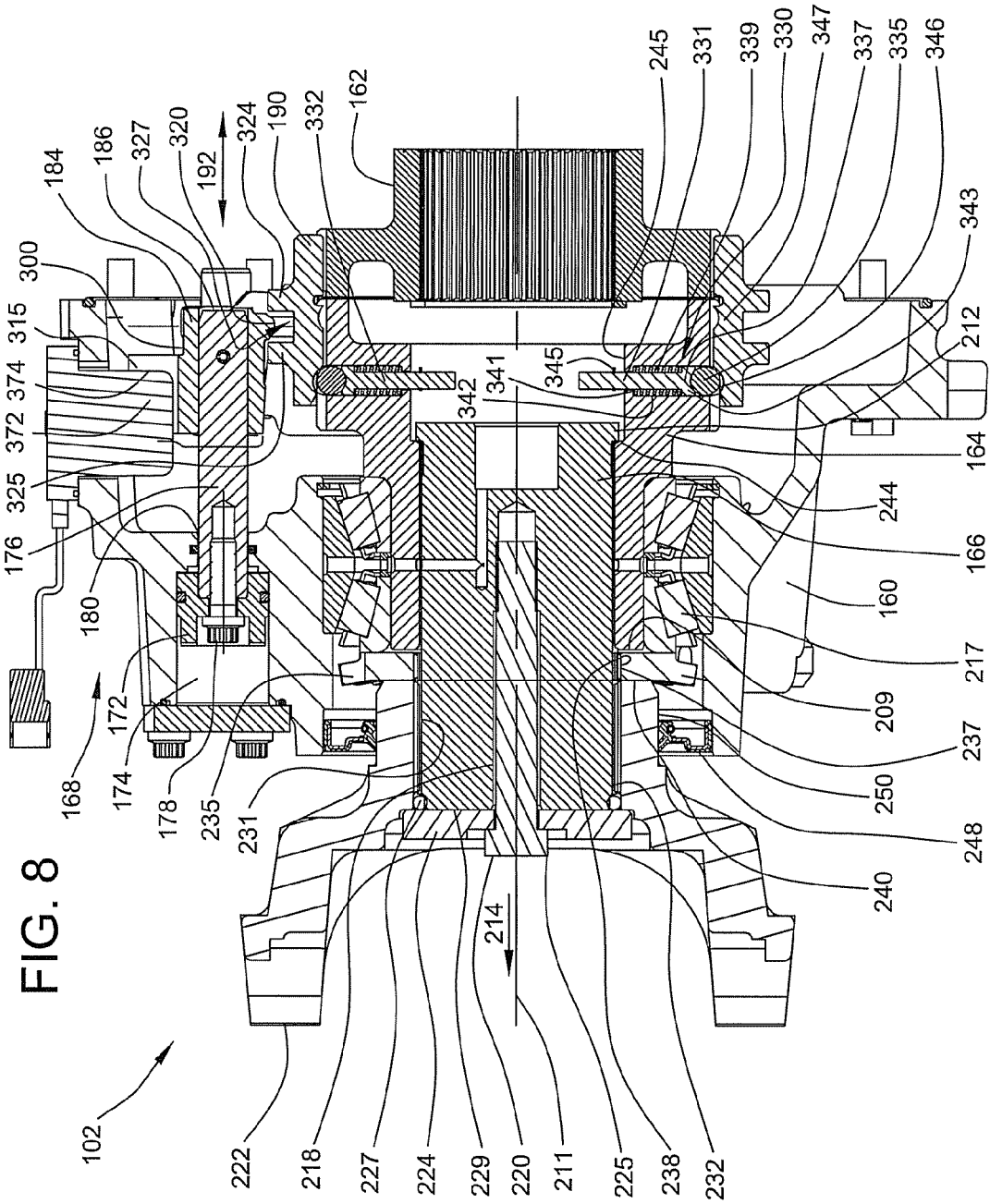
FIG. 8 is a sectional view of the coupler of FIG. 5 with a coupling mechanism of the coupler in an engaged position.

Referring to FIG. 8, the coupling mechanism 168 can include a piston 172 disposed within a chamber 174 defined by the coupler housing 160 such that the piston is reciprocally movable over a range of travel between an engaged position (shown in FIG. 8) and a disengaged position (shown in FIG. 10), a rod 176 connected at a first end 177 to the piston 172 via a bolt 178 and extending through an aperture 180 communicating with the chamber 174, a fork 184 mounted to a second end 186 of the rod, and a sliding collar 190 interengaged with the fork 184. The sliding collar 190 is operably arranged with the fork 184 for movement of the sliding collar 190.

Figure 9:
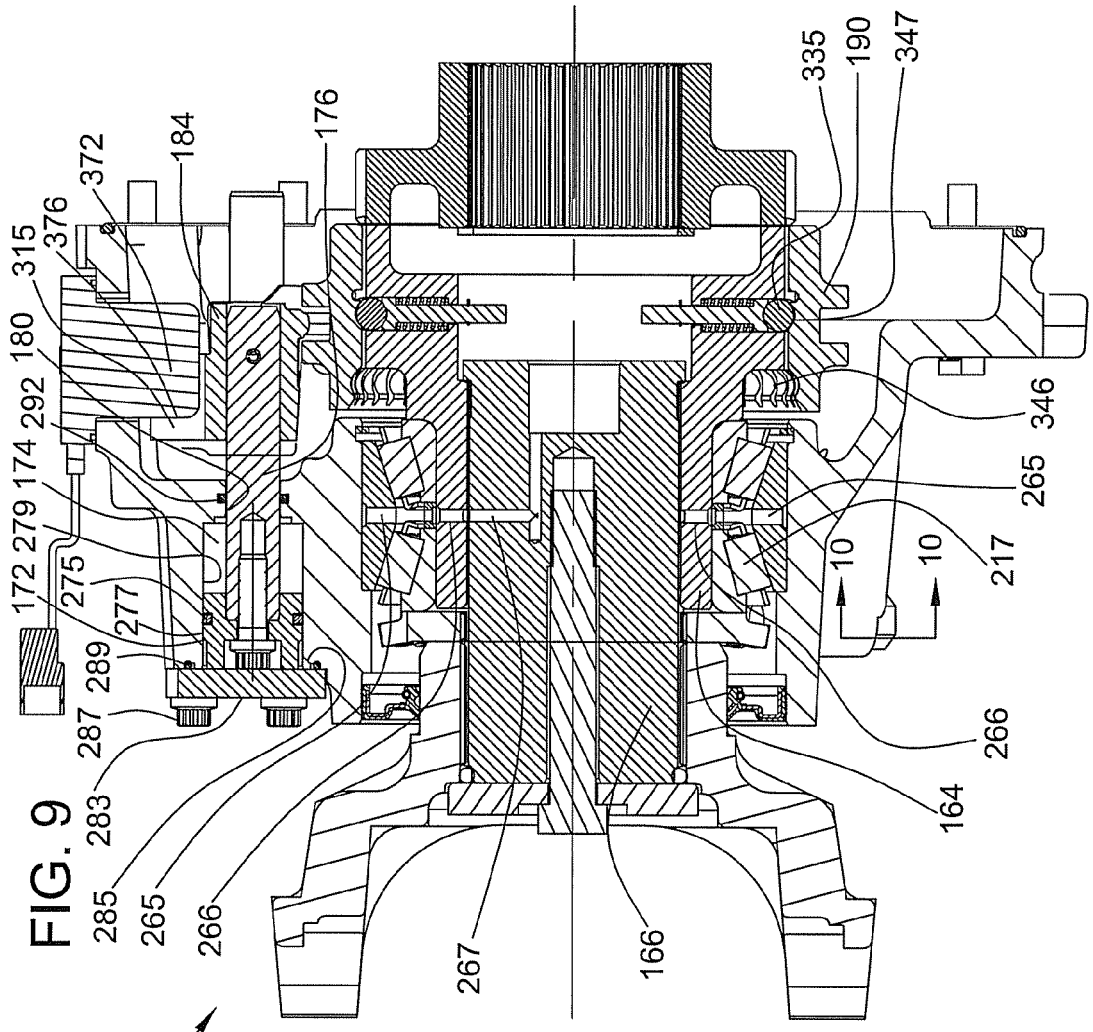
FIG. 9 is a view similar to FIG. 8, but with the coupling mechanism in a disengaged position.

The interengagement of the piston 172, the rod 176, the fork 184, and the sliding collar 190 allow all of these components to be axially movable along a longitudinal axis 192 defined by the rod 176 such that movement of the piston 172 between the engaged position and the disengaged position causes the rod 176, the fork 184, and the sliding collar 190 to similarly move between an engaged position (FIG. 8) and a disengaged position (FIG. 9). The sliding collar 190 is rotatively coupled to the bearing carrier 164 and selectively rotatively coupled with the hub 162 such that, when the piston 172 is in the engaged position, the sliding collar 190 is rotatively coupled with the hub 162, thereby rotatively coupling the hub 162 and the bearing carrier 164. When the piston 172 is in the disengaged position, the sliding collar 190 is disengaged from the hub 162.

Referring to FIG. 4, the hub 162 of the rear vehicle coupler 102 is rotatively coupled to a rear end 192 of the gear train output shaft 150. The hub 162 of the front vehicle coupler 101 is rotatively coupled to a front end 193 of the gear train output shaft 150. The coupling mechanisms 168 of the front and rear vehicle couplers 101, 102 can be selectively operated to sequentially couple the coupler output shafts 166 of the rear vehicle coupler 102 and the front vehicle coupler 101 such that the rear vehicle coupler 102 is engaged prior to the front vehicle coupler 101 being engaged. The hub 162 of the draw works, or auxiliary, coupler 103 is aligned with the first longitudinal axis 139 about which the input gear 135 rotates. The input gear 135 and the hub 162 of the auxiliary coupler 103 are configured such that the transmission output shaft can rotatively couple with both the input gear 135 and the hub 162 of the auxiliary coupler 103.

Figure 6:
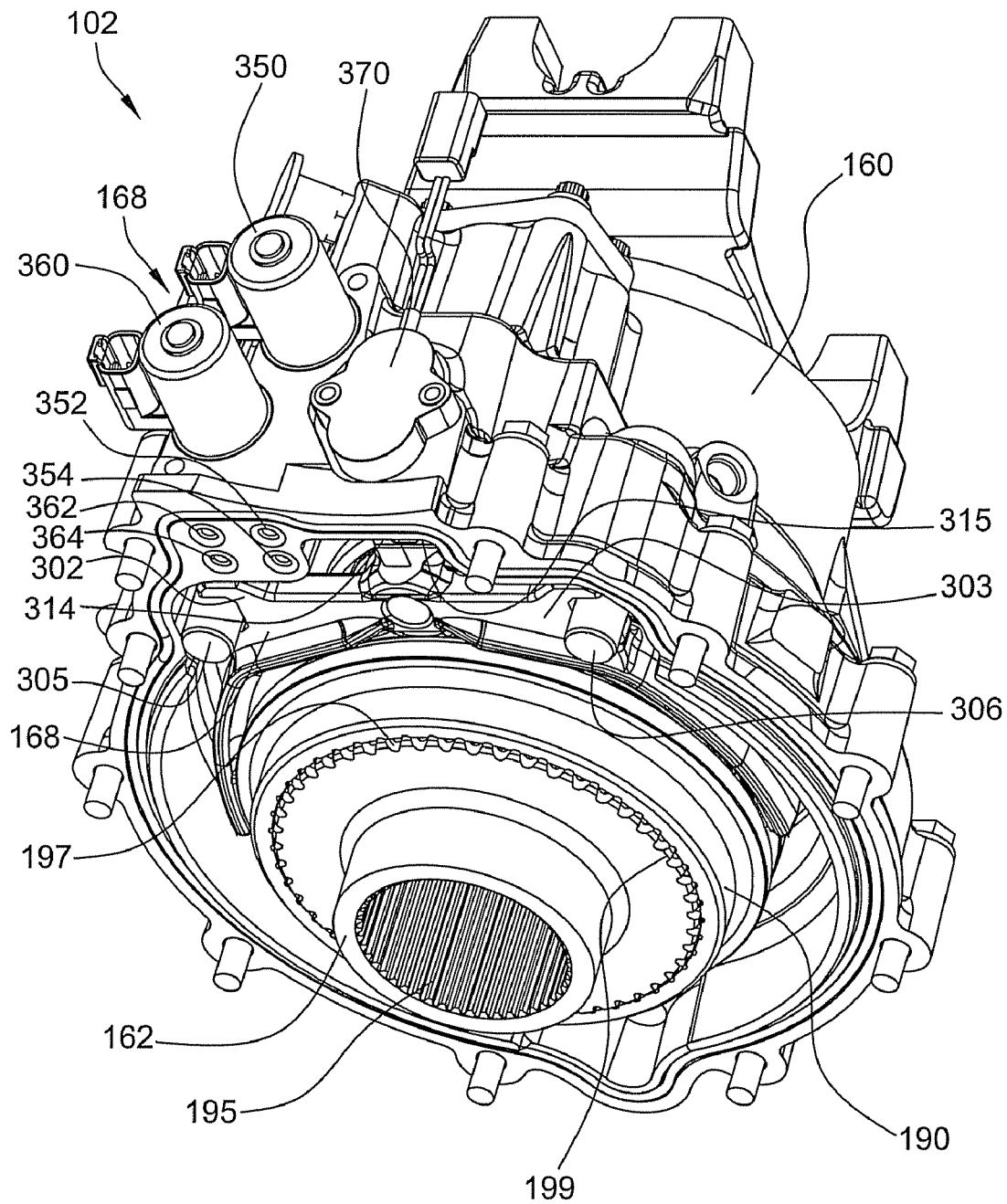
FIG. 6 is a perspective view of a second end of the coupler of FIG. 5.

Referring to FIG. 6, the hub 162 of each coupler includes an internal input gear surface 195 for interengagement with the output shaft of the transmission or the transfer gear group with which the coupler is associated. The interengaged output shaft can support the hub 162. The hub 162 includes an external collar gear surface 197 for selective engagement with an internal hub gear surface 199 of the sliding collar 190 (see also, FIG. 11). The hub 162 and the sliding collar 190 are selectively rotatively coupled together via the internal hub gear surface 199 of the sliding collar and the external collar gear surface 197 of the hub when the sliding collar 190 is in the engaged position, as shown in FIG. 8, and are decoupled from each other when the sliding collar 190 is in the disengaged position, as shown in FIG. 9.

Figure 7:
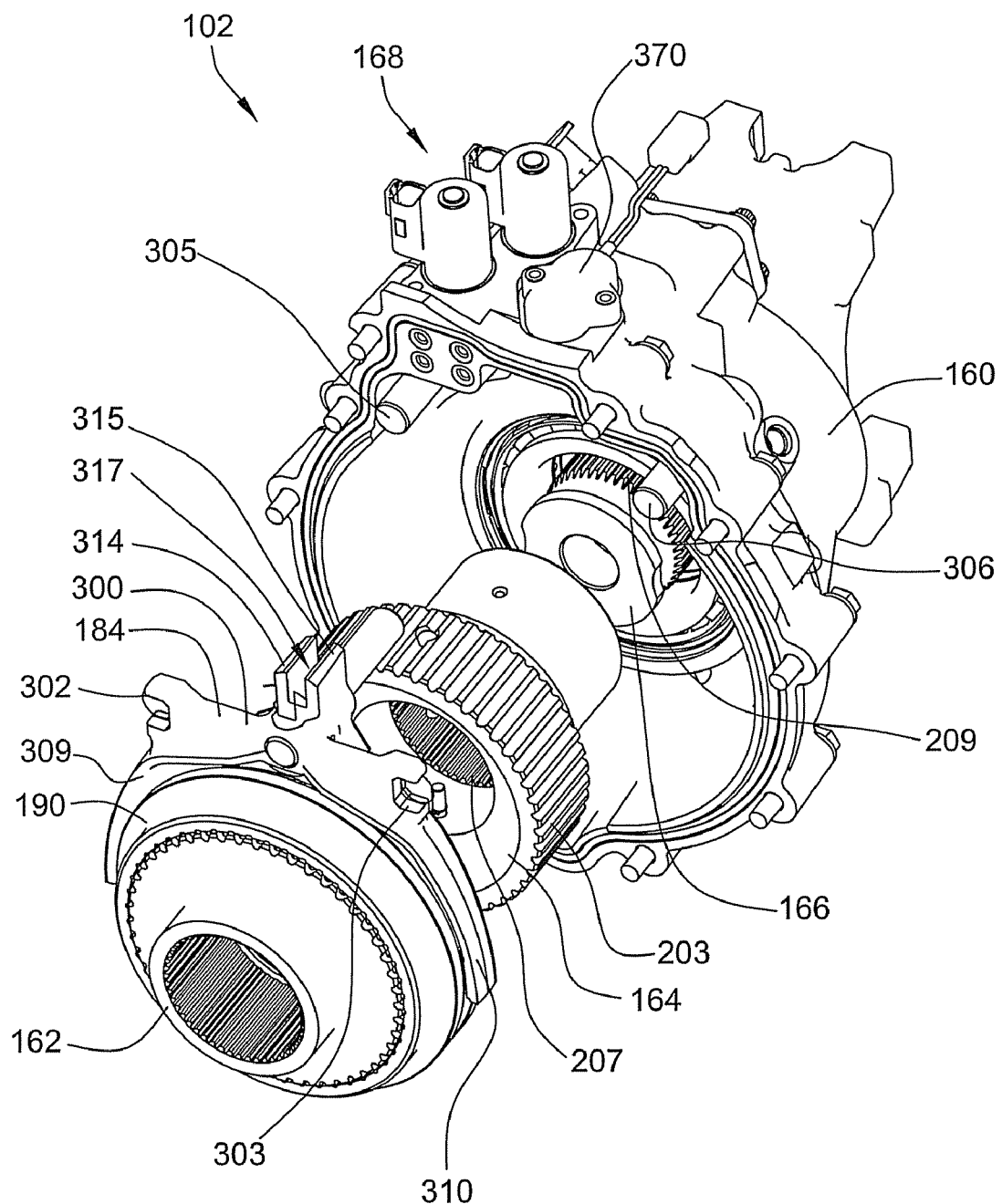
FIG. 7 is a partially exploded view of the coupler of FIG. 5.
Figure 11:
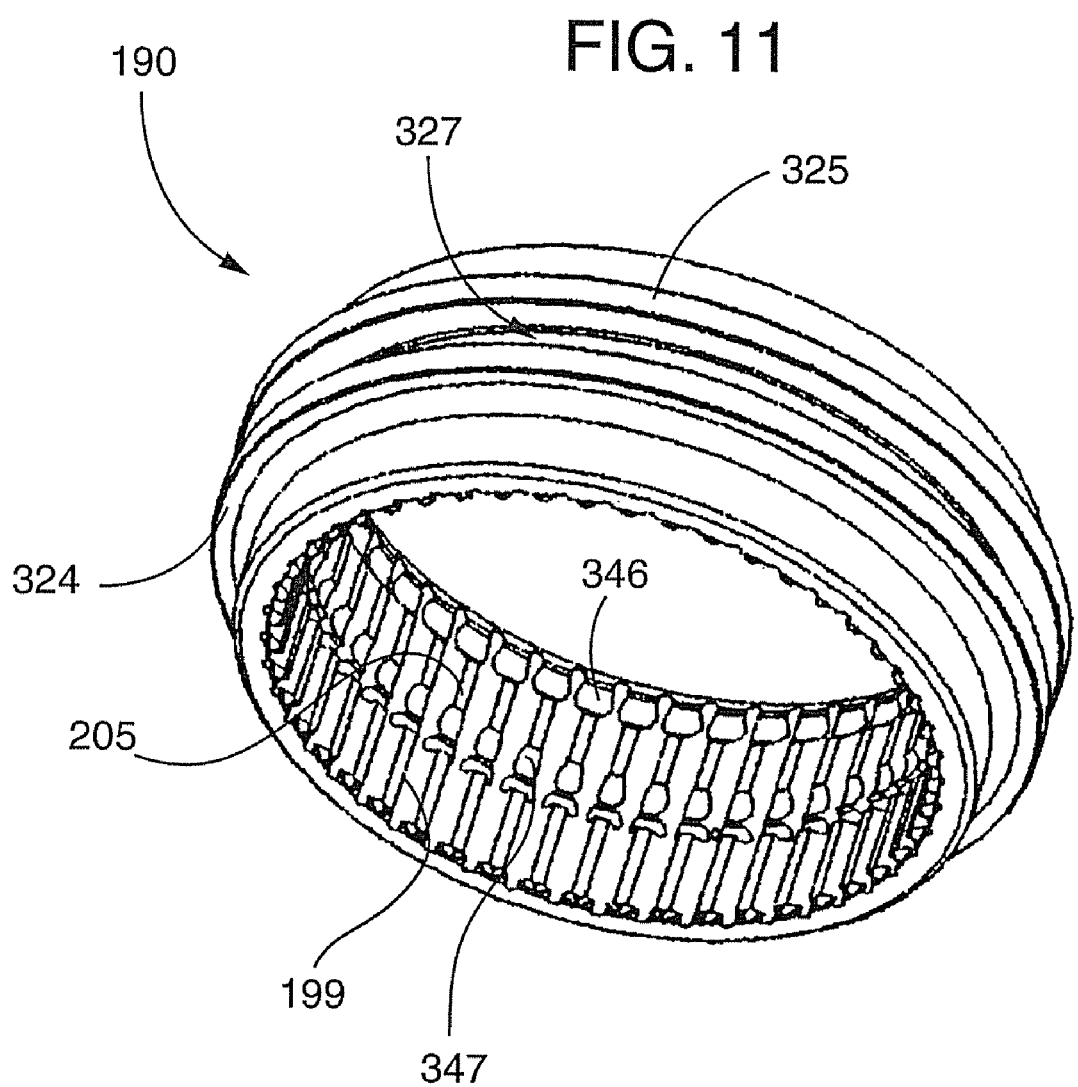
FIG. 11 is a perspective view of a sliding collar of the coupling mechanism of the coupler of FIG. 5.

Referring to FIG. 7, the bearing carrier 164 includes an external collar gear surface 203 for rotative coupling to an internal bearing carrier gear surface 205 of the sliding collar 190 (see FIG. 11). The sliding collar 190 and the bearing carrier 164 are rotatively coupled together via the external collar gear surface 203 of the bearing carrier and the internal bearing carrier gear surface 205 of the sliding collar when the sliding collar 190 is in the engaged position (see FIG. 8) and in the disengaged position (see FIG. 9).

Referring to FIG. 7, the bearing carrier 164 also includes an internal shaft gear surface 207 for rotative coupling to an external gear surface 209 of the coupler output shaft 166. The coupler output shaft 166 and the bearing carrier 164 are rotatively coupled together via the interengagement of the external gear surface 209 of the output shaft and the internal shaft gear surface 207 of the bearing carrier such that the coupler output shaft 166 is reciprocally movable along a longitudinal axis 211 (see FIG. 8) thereof to facilitate the mounting of the coupler output shaft 166 to its associated drive line.

Referring to FIG. 8, the output shaft 166 includes an end flange 212 to serve as a stop to limit the reciprocal movement thereof in an outward direction 214 along the longitudinal axis 211. A plurality of split-tapered roller bearings 217 is provided to rotatively mount the bearing carrier 164 and the output shaft 166.

The coupler output shaft 166 includes a yoke bolt passage 218 for threadingly engaging a mounting bolt 220 for securing a yoke 222 to the output shaft 166 such that it is rotatively coupled with the output shaft 166. A thrust plate 224 can be interposed between the bolt head 225 and the yoke 222 to further retain the yoke to the output shaft 166. An o-ring seal 227 can be provided at a distal end 229 of the coupler output shaft 166 such that it is disposed between the thrust plate 224, the yoke 222, and the output shaft 166. The yoke 222 can also include an internal shaft gear surface 231 for interengagement with a portion 232 of the external gear surface 209 of the output shaft 166 to further rotatively couple the yoke 222 and the output shaft 166.

An output rotor 235 is mounted to the coupler output shaft 166. The output rotor 235 is annular and encircles the coupler output shaft 166. The output rotor 235 includes an internal shaft gear surface 237 for interengagement with a portion 238 of the external gear surface 209 of the output shaft 166 to rotatively couple the output rotor to the output shaft 166. The output rotor 235 is positioned between the yoke 222 and the bearing carrier 164.

The coupler output shaft 166 can be fixed longitudinally via the interengagement of an inner end 240 of the yoke 222 against the output rotor 235 and the threaded attachment of the output shaft 166 to the yoke 222 via the mounting bolt 220, which can, in turn, draw the end flange 212 into engagement with a shoulder 244 defined by a counterbore 245 defined in the bearing carrier 164 and leading to the internal shaft gear surface 207. A lip-type seal 248 is mounted to the housing 160 and can be provided for sealingly engaging an external surface 250 of the yoke 222.

Figure 5:
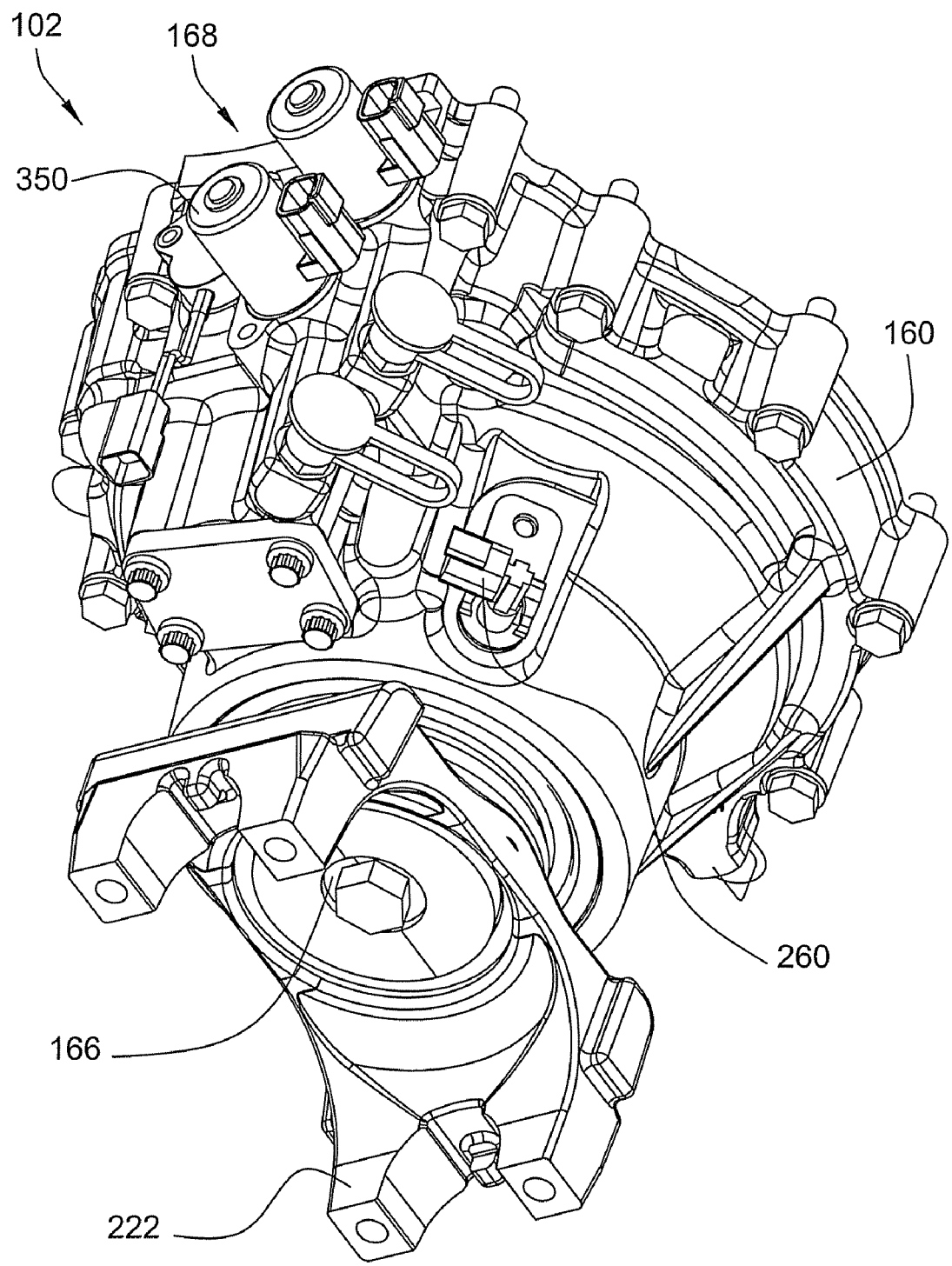
FIG. 5 is a perspective view of a first end of a coupler of the drop box of FIG. 2.

Referring to FIG. 5, a coupler output seed sensor 260 can be arranged with the output rotor to sense the speed at which the output shaft 166 and, in turn, the yoke 222 rotate. The speed sensor 260 can be any suitable sensor. In one embodiment, the speed sensor 260 can be the type of sensor known as a "bolt-n-go" sensor.

Figure 10:
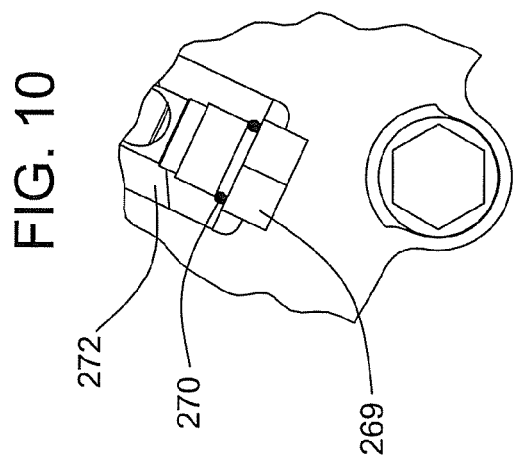
FIG. 10 is a cross-sectional view taken along line 10-10 in FIG. 9.

Referring to FIG. 9, lube passages 265, 266, 267 are defined through the split bearing assembly 217, the bearing carrier 164, and the shaft 166 to allow for the lubrication of the internal components of the coupler. Referring to FIG. 10, a removable drainage plug 269 is provided to allow for the draining of the lubricant from the coupler. An O-ring seal 270 can be disposed around the plug 269 to provide a seal between the plug 269 and a drain passage 272 into which the plug 269 is disposed. When the plug 269 is removed from the drain passage 272, lubricant disposed within the coupler 102 can flow through the drain passage 272 out of the coupler 102.

Referring to FIG. 9, the piston 172 is equipped with a seal 275 around its exterior surface 277 for sliding, sealing engagement with an interior wall surface 279 of the chamber 174. To facilitate assembly of the piston 172 to the rod 176, a cover 283 can be provided in an end 285 of the chamber 174 opposite the aperture 180 through which the rod 176 extends. The cover 283 can be secured to the housing 160 via a plurality of bolts 287. An O-ring seal 289 can be provided to sealingly mount the cover 283 to the housing 160.

A quad ring seal 292 is disposed within the aperture 180 such that the seal 292 is in sliding, sealing engagement with the reciprocally movable rod 176 to further seal the chamber 174. The fork 184 is mounted to the rod 176 via a mounting spring 295.

Referring to FIG. 7, the fork 184 is reciprocally mounted to the coupler housing 160. The fork includes a body 300 having a pair of mounting ears 302, 303 that can be respectively supported by a pair of posts 305, 306 mounted to the housing 160 such that the fork 184 is reciprocally movable with respect to the posts 305, 306 (see FIG. 6). A pair of arms 309, 310 extend from the body 300 of the fork and encircle the sliding collar 190 such that about one-half of the perimeter of the sliding collar 190 is in interengaged relationship with the fork 184. The fork 184 includes a pair of upright walls 314, 315 extending from the body 300 thereof. The walls 314, 315 are in spaced relationship with respect to each other to define a gap 317 therebetween.

Referring to FIG. 8, the fork 184 includes a protrusion 320 that projects from the body 300 and the aims of the fork 184 such that the protrusion 320 extends around about one-half of the outer perimeter of the sliding collar 190. The sliding collar 190 includes a pair of annular flanges 324, 325 that are disposed in spaced relationship to each other to define a groove 327 therebetween (see also, FIG. 11). The protrusion 320 of the fork is disposed within the groove 327 of the sliding collar such that reciprocal movement of the fork 184 moves the sliding collar 190 in the same direction via engaging contact between the protrusion 320 and one of the flanges 324, 325. The protrusion 320 of the fork and the groove 327 of the sliding collar are configured to allow for rotational movement of the sliding collar 190 relative to the fork 184.

The coupling mechanism 168 can include a detent mechanism 330 to facilitate the positioning of the sliding collar 190 in the engaged position and the disengaged position. The detent mechanism 330 can retain the sliding collar 190 in at least one of the engaged position and the disengaged position. In the illustrated embodiment, the detent mechanism 330 includes a pair of detent assemblies 331, 332 each including a ball 335, a plunger 337, and a spring 339. The plunger 337 supports the ball 335. The spring 339 is disposed between an end surface 341 of a counterbore 342 defined in the bearing carrier 164 and a head portion 343 of the plunger 337 for urging the plunger 337 in a radially outward direction to thereby urge the ball 335 in an outward direction so as to protrude from the counterbore 342 of the bearing carrier 164. The plunger 337 includes a pin 345 to limit the travel of the plunger 337 in the radially outward direction.

Referring to FIGS. 8 and 11, the sliding collar 190 includes a pair of circumferentially arranged rows 346, 347 of concave recesses configured to retentively engage the ball 335 of each detent assembly 331, 332. The first and second rows 346, 347 of recesses are disposed at opposing ends of the internal bearing carrier gear surface 205 of the sliding collar 190. The first row 346 of recesses is disposed to engage the ball 335 of each detent assembly 331, 332 when the sliding collar 190 is in the engaged position with the hub 162. The second row 347 of recesses is disposed to engage the ball 335 of each detent assembly 331, 332 when the sliding collar 190 is in the disengaged position such that the hub 162 is free to rotate relative to the bearing carrier 164. The spring 339 of each detent assembly 331, 332 is arranged with its respective bore 342 and plunger 337 to urge the associated ball 335 into retentive engagement with one of the recesses of the first row 346 of recesses of the sliding collar 190 when the sliding collar is in the engaged position (FIG. 8) and into retentive engagement with one of the recesses of the second row 347 of recesses of the sliding collar 190 when the sliding collar 190 is in the disengaged position (FIG. 9).

Referring to FIGS. 5 and 6, an engage solenoid 350 can be provided to selectively move the coupling mechanism 168 from the disengaged position to the engaged position. The engage solenoid 350 is in hydraulic communication with the chamber 174 to selectively move the piston 172 from the disengaged position to the engaged position (see FIG. 8). The engage solenoid 350 can be used to move the piston 172 to the engaged position. The engage solenoid can be operated to maintain the piston 172 in the engaged position. Referring to FIG. 6, an engage solenoid supply port 352 and an engage solenoid drain port 354 can be in hydraulic communication with the engage solenoid 350 to supply hydraulic fluid to the engage solenoid 350 when operating the engage solenoid to move the piston to the engaged position and to receive fluid from the chamber when the piston moves from the engaged position to the disengaged position, respectively.

Referring to FIGS. 5 and 6, a disengage solenoid 360 can be provided to selectively move the coupling mechanism 168 from the engaged position to the disengaged position. The disengage solenoid 360 is in hydraulic communication with the chamber 174 to selectively move the piston 172 from the engaged position to the disengaged position (see FIG. 9). The disengage solenoid 360 can be used to move the piston 172 to the disengaged position. The disengage solenoid 360 can be operated to maintain the piston 172 in the disengaged position. Referring to FIG. 6, a disengage solenoid supply port 362 and a disengage solenoid drain port 364 can be in hydraulic communication with the disengage solenoid 360 to supply hydraulic fluid to the disengage solenoid 360 when operating the disengage solenoid to move the piston to the disengaged position and to receive fluid from the chamber when the piston moves from the disengaged position to the engaged position, respectively.

Referring to FIG. 6, a position sensor 370 can be operably arranged with the coupling mechanism 168 for sensing the position of the coupling mechanism 168 when the coupling mechanism is in at least one of the engaged position and the disengaged position. The position sensor 370 can be used to sense the position of the fork 184 and, thus, the sliding collar 190. The position sensor 370 is disposed between the walls 314, 315 of the fork (see FIG. 7). The position sensor 370 is operably arranged with the fork 184 to sense the position of the walls when the piston 172 is in at least one of the engaged position and the disengaged position. In the illustrated embodiment, the position sensor is a blade-style linear position sensor.

Referring to FIG. 8, when the fork 184 is in the engaged position, at least a portion of the walls 315 are in non-overlapping relationship with a blade portion 372 of the position sensor 370 at a first end 374 thereof. Referring to FIG. 9, when the fork 184 is in the disengaged position, at least a portion of the walls 315 are in non-overlapping relationship with a blade portion 372 of the position sensor 370 at a second end 376 thereof. The position sensor 370 can detect the relative movement of the walls of the fork 184 and can send a signal to an electronic control module (ECM) based on the position of the walls of the fork 184.

Predetermined position thresholds can be established for the sensor 370 to use to detect whether the coupling mechanism 168 is in the engaged position and disengaged position. For example, if the position sensor 370 senses that the fork 184 is in a position beyond the "engaged" threshold at the first end 374, for example, then the sensor 370 can send a signal to the ECM indicating that the coupling mechanism 168 is in the engaged position. Likewise, if the position sensor 370 senses that the fork 184 is in a position beyond the "disengaged" threshold at the second end 376, for example, then the sensor 370 can send a signal to the ECM indicating that the coupling mechanism is in the disengaged position.

Figure 12:
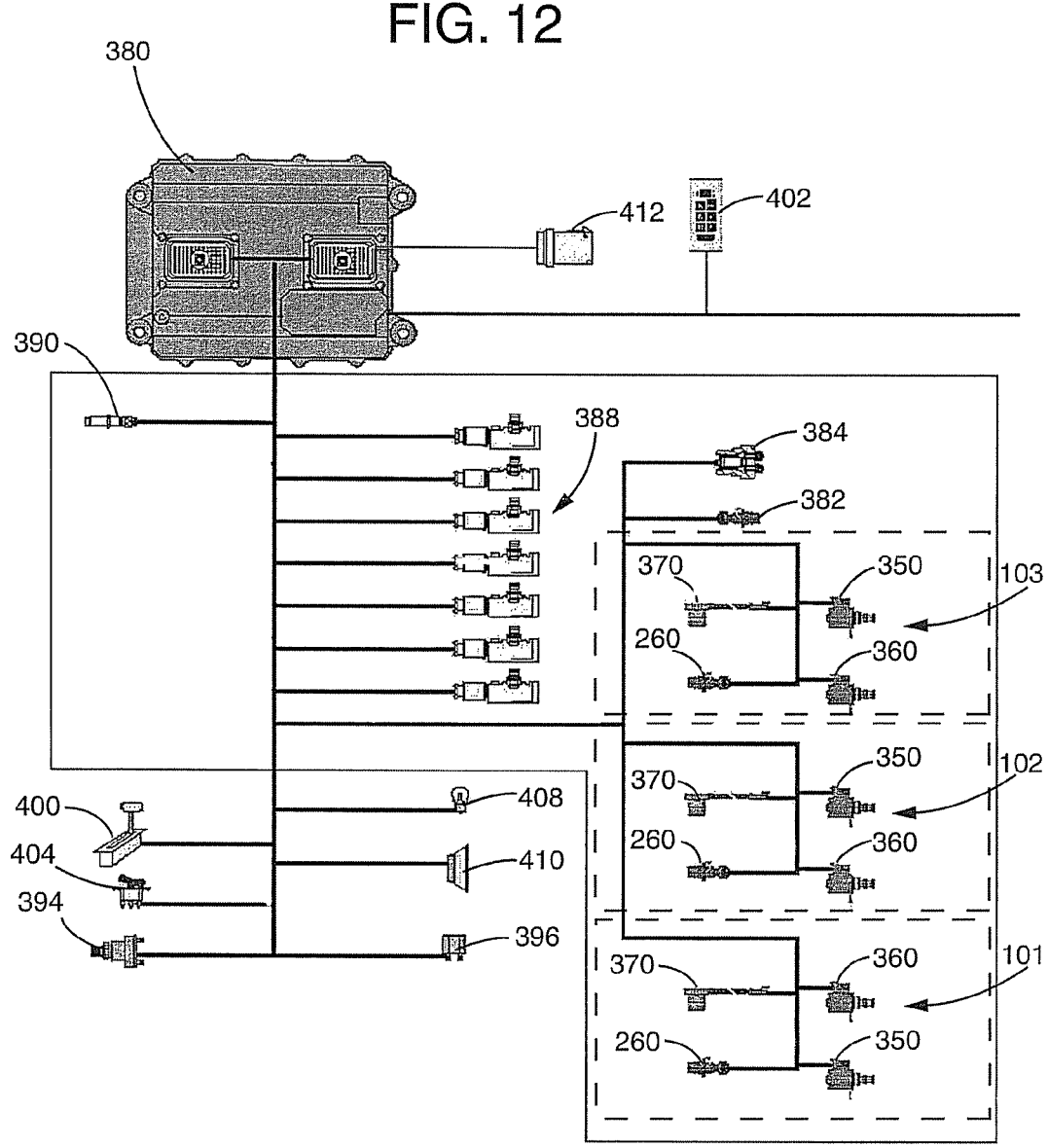
FIG. 12 is a block diagram of a control system for the transmission and drop box of FIG. 1.
Figure 13:
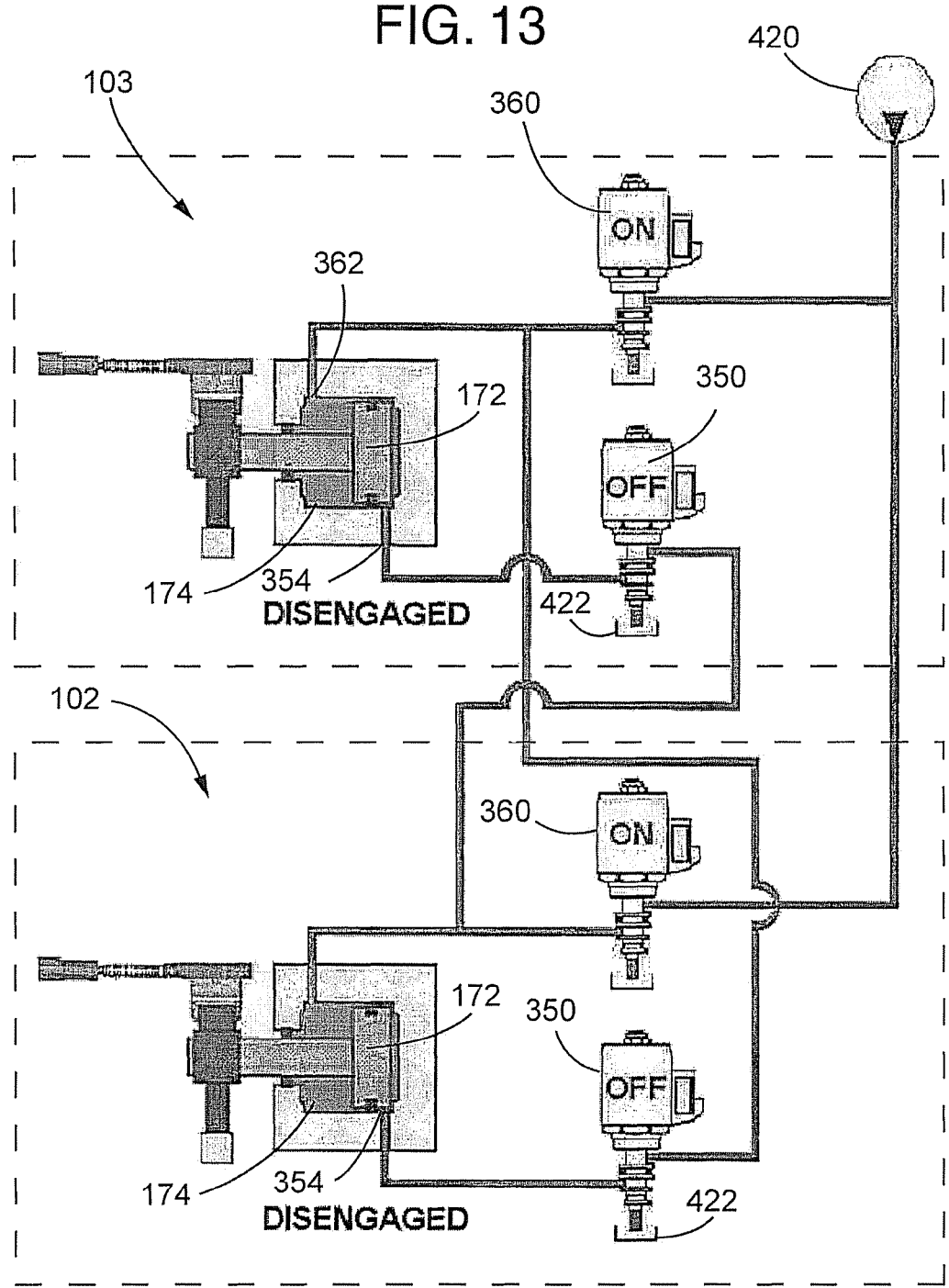
FIG. 13 is a diagrammatic view of a solenoid assembly for controlling the drop box shown with the drop box in a neutral position.

Referring to FIG. 12, the ECM 380 can automatically control the engagement of each coupler 101, 102, 103. The ECM 380 can be electrically connected to the engage solenoid 350, the disengage solenoid 360, the position sensor 370, and the coupler output speed sensor 260 of each of the couplers 101, 102, 103. A transmission output speed sensor 382 is electrically connected to the ECM 380. The transmission output speed sensor 382 can be operably arranged with the transmission output shaft to detect the transmission speed. The transmission output speed sensor 382 can send a signal to the ECM 380 indicating the rotational speed of the transmission output shaft.

A filter bypass switch 384 can be electrically connected to the ECM 380. The ECM 380 can control the filter bypass switch 384 to selectively bypass the hydraulic circuit 111 of the drop box 80.

The ECM 380 can be electrically connected to a transmission clutch solenoid assembly 388 for selectively controlling the transmission 74. An engine speed sensor 390 can be electrically connected to the ECM 380. The engine speed sensor 390 can be operably arranged with the engine 72 to detect the engine output speed. The engine speed sensor 390 can send a signal to the ECM 380 indicating the engine speed.

A key switch 394 and a start relay 396 can be electrically connected to the ECM 380. The key switch 394 can be operated via a key to send a start signal to the ECM 380 which, in turn, controls the start relay 396 to operate the engine 72.

A gear shift selector 400, a keypad shifter 402, and a shift selector switch 404 can be electrically connected to the ECM 380. A user can designate via the shift selector switch 404 either the gear shift selector 400 or the keypad shifter 402 as the device which can control the transmission 74. The shift selector switch 404 includes a toggle switch to select either the gear shift selector 400 or the keypad shifter 402. The shift selector switch 404 can send a signal to the ECM 380 to indicate which of the gear shift selector 400 and the key pad shifter 402 has been selected by the user. The gear shift selector 400 can be used to operate the well service rig when it is in drive mode. The key pad shifter 402 can be used to operate the well service rig when it is in well-service mode.

A plurality of indicator lights 408 and audio devices 410 can be electrically connected to the ECM 380 such that the ECM 380 can provide information to a user via the indicator lights 408 and the audio devices 410. A data link connector 412 can be electrically connected to the ECM 380. A technician can use the data link connector 412 for downloading diagnostic information from the ECM 380 which can be useful in providing maintenance for the well service rig.

The ECM 380 can de-energize the disengage solenoid 360 and energize the engage solenoid 350 of a particular coupler selected by a user to be moved to the engaged position. The position sensor 370 can signal the ECM 380 once it detects that the fork of the coupling mechanism of the selected coupler has moved beyond the predetermined threshold for the engaged position.

The ECM 380 can de-energize the engaged solenoid 350 and energize the disengage solenoid 360 of a particular coupler selected by a user to be moved to the disengaged position. The position sensor 370 can signal the ECM 380 once it detects that the fork of the coupling mechanism of the selected coupler has moved beyond the predetermined threshold for the disengaged position.

The ECM 380 can be operable to prevent the engage solenoid 350 of the front vehicle coupler 101 from moving the coupling mechanism of the front vehicle coupler 102 to the engaged position until the engage solenoid 350 of the rear vehicle coupler 102 has moved the coupling mechanism of the rear vehicle coupler 102 to the engaged position. The ECM 380 can be operable to prevent the engage solenoid 350 of the auxiliary coupler 103 from moving the coupling mechanism of the auxiliary coupler 103 to the engaged position unless the coupling mechanism of both the rear vehicle coupler 102 and the front vehicle coupler 101 are in the disengaged position.

The ECM 380 can be configured such that it will engage a coupler only when the engine 72 and the transmission 74 are operating within certain parameters. For example, in one embodiment, the ECM can be configured such that the engagement of any coupler can only occur when the transmission 74 is in neutral, the shifter is requesting neutral, the engine output speed as detected by the engine speed sensor 390 is between 300 rpm and 800 rpm, and the transmission output speed as detected by the transmission output speed sensor 382 is less than 500 rpm.

The ECM 380 can include a computer readable program code embodied therein for performing a series of operations automatically. When a user selects a coupler to be engaged, the ECM 380 can command the transmission 74 to engage the park position (to stop output rotation) for a predetermined amount of time, three seconds, for example. The ECM 380 can command the transmission to engage the no-clutch neutral position for a predetermined amount of time, five seconds, for example, to dissipate any residual output torque. The ECM 380 can determine the position of the other couplers, as indicated by their respective position sensors, and command any engaged coupler or couplers to disengage. The ECM 380 can command the selected coupler to engage. The ECM 380 can receive information from the position sensor of the selected coupler to determine whether the selected coupler is engaged. If the position sensor of the selected coupler does not detect that the fork of the selected coupler's coupling mechanism is in the engaged position within a predetermined amount of time, five seconds, for example, the ECM 380 can command all couplers to disengage. The ECM 380 can command the transmission to engage a forward drive position, such as first forward gear, for a predetermined amount of time, three seconds, for example, to cause the transmission output shaft to rotate. The ECM 380 can repeat the foregoing operations to re-attempt to engage the selected coupler.

Upon power up of the ECM 380, if the positions of all the couplers 101, 102, 103 match the positions desired by the user, then the appropriate engage solenoids and disengage solenoids can be energized to keep the drop box 80 in this state. If any coupler position does not match the desired position set by the user, then the ECM 380 can command all couplers 101, 102, 103 to disengage. Once all of the couplers are disengaged, the ECM 380 can command the appropriate coupler to move into position as described above.

Figure 14:
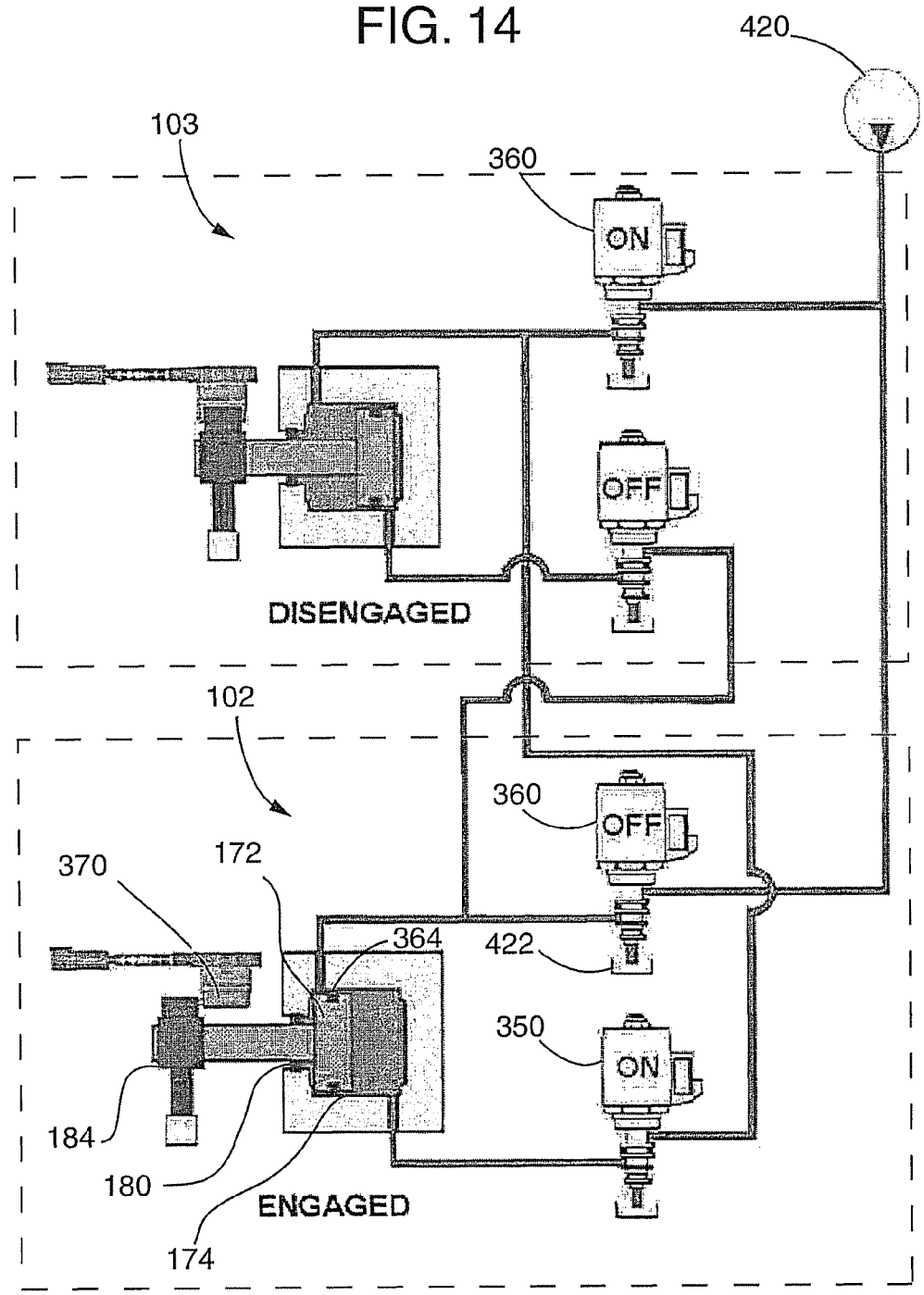
FIG. 14 is a view similar to FIG. 13 showing the drop box in a drive mode.

Referring to FIG. 14, the draw works coupler 103 and the rear vehicle coupler 102 are both in the disengaged position. The engage solenoid 350 of each coupler 102, 103 is de-energized such that it is in an off position such that hydraulic fluid does not flow therethrough to the chamber 174. The disengage solenoid 360 of each coupler 102, 103 is energized to an on position such that a flow of hydraulic fluid supplied by a hydraulic pump 420 can flow through each disengage solenoid 360 to its respective chamber 174 via the disengage solenoid supply port 362. Each piston 172 is in the disengaged position. Hydraulic fluid can exit the respective chamber 174 via the engage solenoid drain port 354 and return to a tank 422.

Referring to FIG. 14, the rear vehicle coupler 102 is in the engaged position. The draw works coupler 103 remains in the disengaged position. The disengage solenoid 360 of the rear vehicle coupler 102 is de-energized such that it is in an off position. The engage solenoid 350 of the rear vehicle coupler 102 is energized to an on position such that a flow of hydraulic fluid can be transmitted from the hydraulic pump 420 through the disengage solenoid 360 of the draw works coupler 103, which is energized to the on position, to the engage solenoid 350 of the rear vehicle coupler 102 for delivery to the chamber 174 via the engage solenoid supply port 352.

The flow of hydraulic fluid from the engage solenoid 350 of the rear vehicle coupler 102 has moved the piston 172 from the disengaged position to the engaged position. The hydraulic fluid disposed between the piston 172 and the aperture 180 of the chamber can exit the chamber 174 via the disengage solenoid drain port 364 and return to the tank 422. The fork 184 is in displaced relationship with respect to the position sensor 370 of the rear vehicle coupler 102. The position sensor 370 can signal the ECM that the rear vehicle coupler 102 is in the engaged position.

Figure 15:
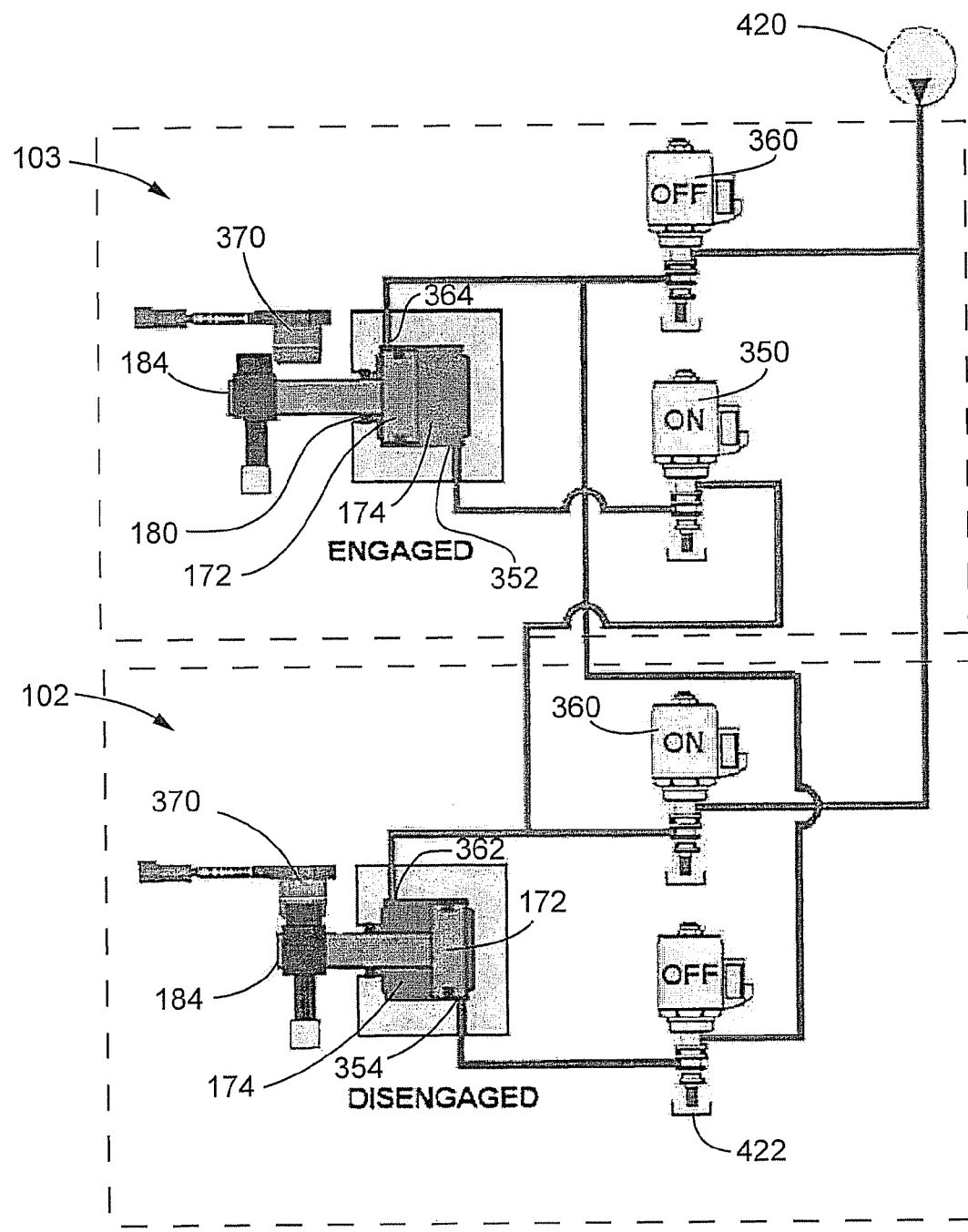
FIG. 15 is a view similar to FIG. 13 showing the drop box in a well-service mode.

Referring to FIG. 15, the rear vehicle coupler 102 is in the disengaged position, and the draw works coupler 103 is in the engaged position. The engage solenoid 350 of the rear vehicle coupler 102 is de-energized such that it is in the off position. The disengage solenoid 360 of the rear vehicle coupler 102 is energized to the on position to allow a flow of hydraulic fluid from the pump 420 through the disengage solenoid 360 to the chamber 174 via the disengage solenoid supply port 362. The hydraulic fluid disposed within the chamber 174 can exit therefrom via the engage solenoid drain port 354 to the tank 422 as the piston 172 moves from the engaged position to the disengaged position. The fork 184 can return to an overlapping position with respect to the position sensor 370. The position sensor 370 of the rear vehicle coupler 102 can send a signal to the ECM that the rear vehicle coupler 102 is disengaged.

Once the ECM has received the signal from the rear vehicle coupler 102 that it is disengaged, the ECM can de-energize the disengage solenoid 360 and operate the engage solenoid 350 of the draw works coupler 103 to allow a flow of hydraulic fluid from the pump 420 through the disengage solenoid 360 of the rear vehicle coupler 102 to the engage solenoid 350 of the draw works coupler 103 into the chamber 174 via the engage solenoid supply port 352. Hydraulic fluid disposed within the chamber 174 between the piston and the aperture 180 can exit from the chamber 174 via the disengage solenoid drain port 364 as the piston 172 moves from the disengaged position to the engaged position. The fork 184 of the draw works coupler 103 is in displaced relationship with respect to the position sensor 370 of the draw works coupler 103. The position sensor 370 of the draw works coupler 103 can send a signal to the ECM to indicate that the draw works coupler 103 is in the engaged position.

Figure 16:
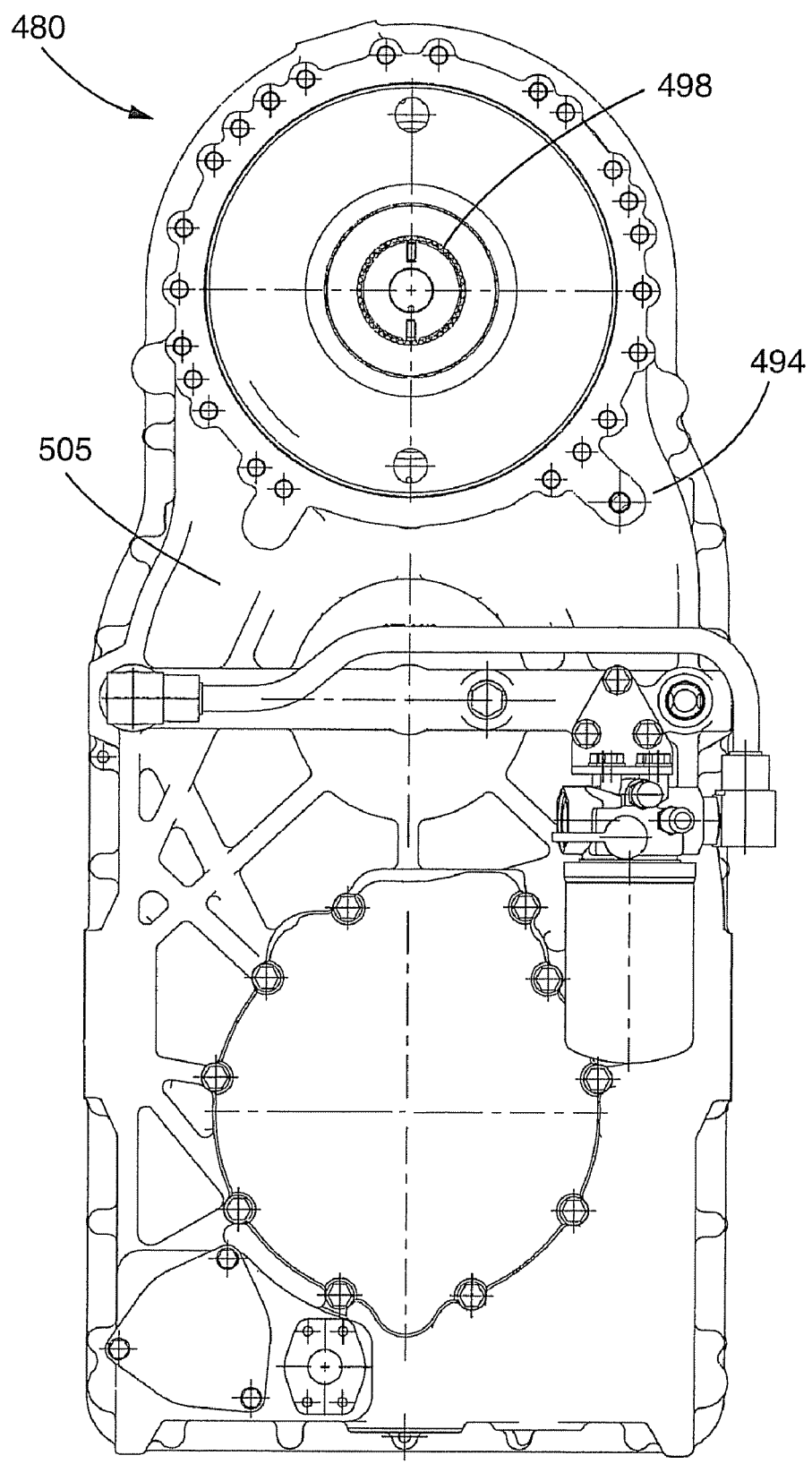
FIG. 16 is a front elevational view of another embodiment of a drop box suitable for use in a powertrain of a well service rig.
Figure 17:
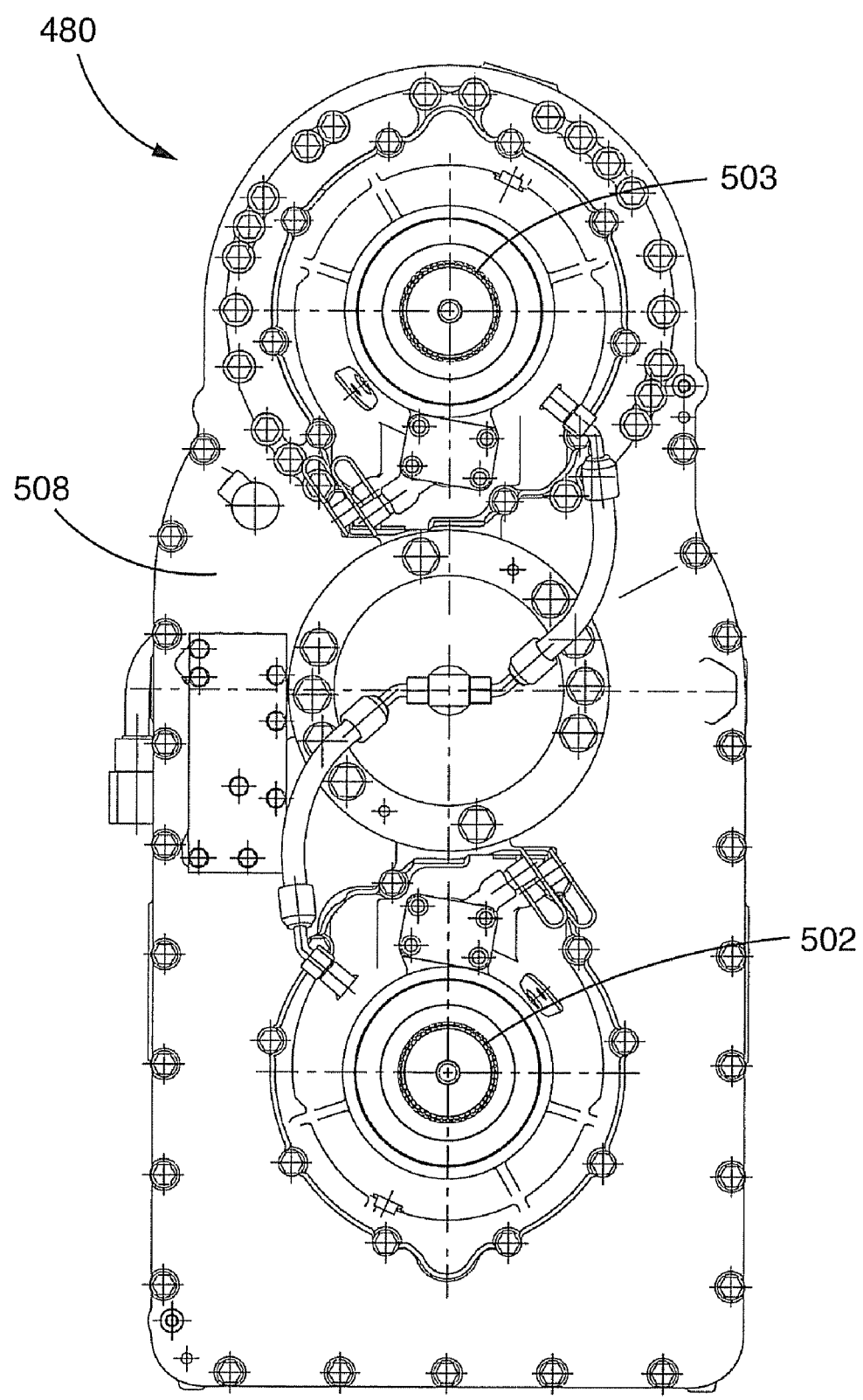
FIG. 17 is a rear elevational view of the drop box of FIG. 16.
Figure 18:
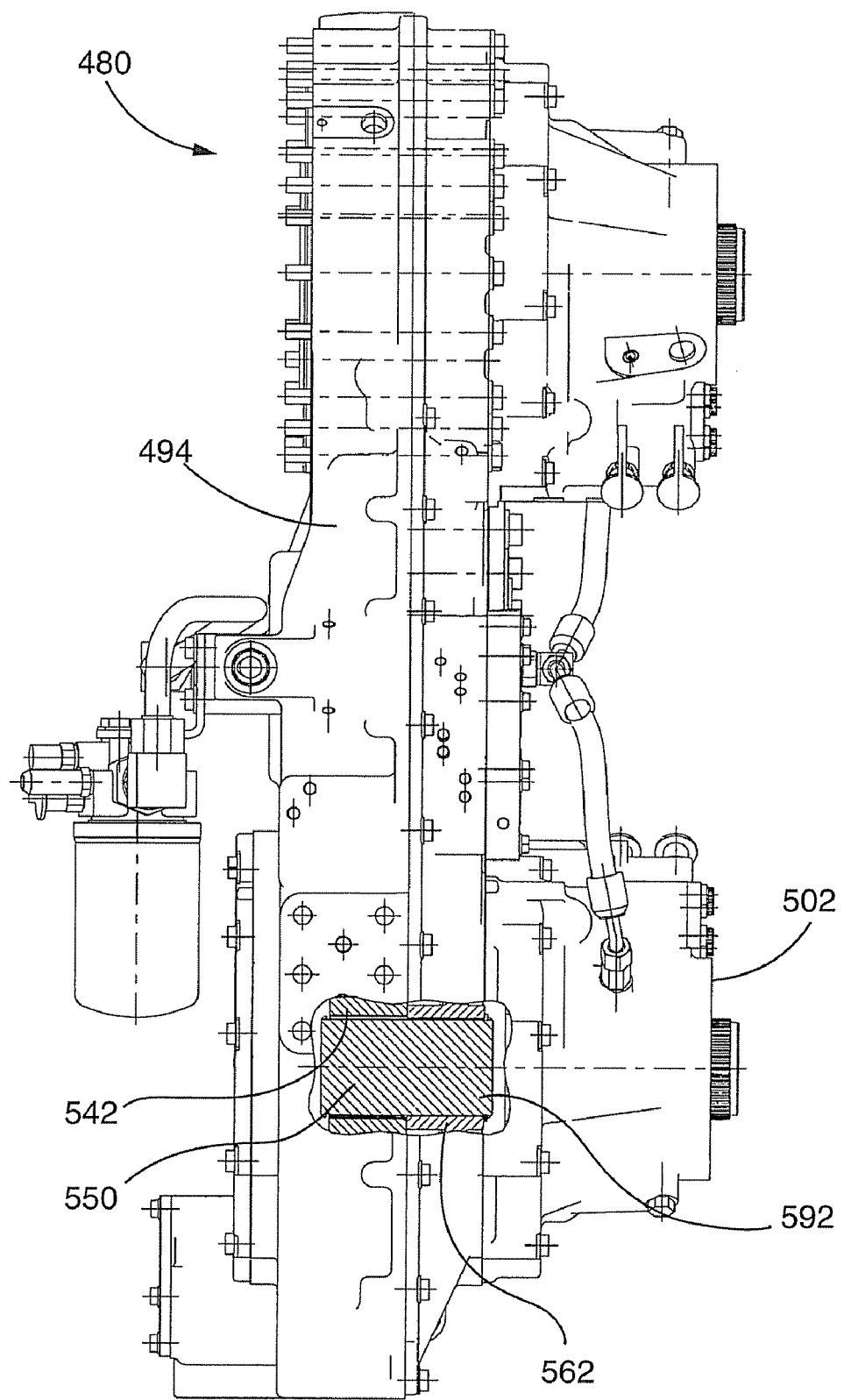
FIG. 18 is a side elevational view of the drop box of FIG. 16 with a portion thereof cut away for illustrative purposes.

Referring to FIGS. 16-18, another embodiment of a drop box 480 is shown. The drop box 480 can include a housing 494 that defines an input port 498 through which an output shaft of the transmission extends for rotatively coupling to a gear transfer train rotatably supported within the housing 494. The housing 494 supports a rear vehicle coupler 502 and an auxiliary, or draw works, coupler 503 that can be respectively rotatively coupled to the vehicle drive line and the draw works drive line. The rear vehicle coupler 502 and the draw works coupler 503 are each selectively rotatively coupled to the gear transfer train. The rear vehicle coupler 502 and the draw works coupler 503 can be substantially identical to the rear vehicle coupler 102 and the draw works coupler 103 of the drop box 80 of FIG. 2.

Referring the FIG. 16, the input port 498 is disposed on a front side 505 of the housing 494 of the drop box 480. Referring to FIG. 17, the rear vehicle coupler 502 and the draw works coupler 503 are disposed on a rear side 508 of the housing 494. The draw works coupler 503 is substantially aligned with the input port 498 disposed on the front side of the housing such that the transmission output shaft can be rotatively coupled with an input gear of the gear transfer train and the hub of the draw works coupler 503.

Referring to FIG. 18, the hub 562 of the rear vehicle coupler 502 can be rotatively coupled with a distal end 592 of a gear train output shaft 550 which, in turn, is rotatively coupled with an output gear 542 of the gear transfer train disposed within the housing 494 of the drop box 480.

The drop box 480 of FIGS. 16-18 can be used in situations where the vehicle drive line is intended to power only a rear tire and axle assembly. The drop box 480 of FIGS. 16-18 can be similar in other respects to the drop box 80 of FIGS. 2-9.

Industrial Applicability

The industrial applicability of the embodiments of a powertrain described herein will be readily appreciated from the foregoing discussion. For example, the present disclosure is applicable to selectively provide propulsion for a well service rig and power for operating the draw works assembly supported by the well service rig. When the drop box is in a drive mode, power is sent from the engine through the transmission to the rear vehicle coupler (and the front vehicle coupler where provided) to provide driving rotation to one (or more) tire and axle assemblies. A user can place a well service rig in the drive mode by operating the gear shift selector. When in the drive mode, the auxiliary coupler of the drop box is disengaged.

The drop box can be placed in a well-service mode wherein the rear vehicle coupler (and front vehicle coupler where provided) are disengaged to prevent further movement of the well service rig. The auxiliary coupler is engaged to power the draw works assembly for conventional well-servicing operations. A user can place the well service rig in the well-service mode by operating the key pad shifter.

The ECM can control the operation of each coupler to facilitate the reliable and automatic operation of the couplers. Furthermore, in some embodiment, the ECM can be configured to ensure the couplers are engaged in a predetermined sequence such that the drop box is not in a drive mode and a well-servicing mode at the same time.

It will be appreciated that the foregoing description provides examples of the disclosed system and technique. However, it is contemplated that other implementations of the disclosure may differ in detail from the foregoing examples. All references and descriptions herein are intended to reference the particular example being discussed at that point and are not intended to imply any limitation as to the scope of the claims appended hereto. All language of distinction and disparagement with respect to certain features is intended to indicate a lack of preference for those features, but not to exclude such from the scope of the claims appended hereto unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this description includes all modifications and equivalents of the subject matter recited in the claims appended hereto as permitted by applicable law. Moreover, any combination of the above-described elements in all possible variations thereof is encompassed by the description and the claims appended hereto unless otherwise indicated herein or otherwise clearly contradicted by context.

What is claimed is:

1. An output transfer gear group comprising:
   a. a housing;
   b. a gear transfer train rotatably supported within the housing, the gear transfer train including an input gear adapted for enmeshing engagement with a transmission output shaft and a gear transfer output shaft, the gear transfer output shaft rotatable upon rotation of the input gear, the gear transfer output shaft having a first distal end and a second distal end;
   c. a first coupler, the first coupler including:
      i. a hub, the hub rotatively coupled with the first distal end of the gear transfer output shaft,
      ii. a bearing carrier,
      iii. a coupler output shaft supported within the bearing carrier and rotatively coupled thereto,
      iv. a coupling mechanism, the coupling mechanism including a sliding collar rotatively coupled to the bearing carrier, the coupling mechanism movable between an engaged position, wherein the sliding collar of the coupling mechanism is rotatively coupled to the hub such that rotation of the hub rotates the sliding collar, the bearing carrier, and the coupler output shaft, and a disengaged position, wherein the coupling mechanism is disengaged from the hub, and
      v. a solenoid adapted to control a flow of hydraulic fluid to selectively move the coupling mechanism from the disengaged position to the engaged position;
   d. a second coupler, the second coupler including:
      i. a second hub, the second hub rotatively coupled with the second distal end of the gear transfer output shaft,
      ii. a second bearing carrier,
      iii. a second coupler output shaft supported within the second bearing carrier and rotatively coupled thereto, and
      iv. a second coupling mechanism, the second coupling mechanism engaged with the second bearing carrier, the second coupling mechanism movable between an engaged position, wherein the coupling mechanism is engaged with the second hub such that rotation of the second hub rotates the second bearing carrier and the second coupler output shaft, and a disengaged position, wherein the second coupling mechanism is disengaged from the second hub; and
      v. an engage solenoid adapted to control a flow of hydraulic fluid to selectively move the second coupling mechanism from the disengaged position to the engaged position; and
   e. a controller, the controller electrically connected to the solenoid of the first coupler and the engage solenoid of the second coupler, the controller operable to prevent the engage solenoid of the second coupler from moving the second coupling mechanism of the second coupler to the engaged position until the solenoid of the first coupler has moved the coupling mechanism of the first coupler to the engaged position.

2. The output transfer gear group according to claim 1, wherein the gear transfer train includes an idler gear enmeshed with the input gear, and an output gear, the gear transfer output shaft rotatively coupled to the output gear, the output gear arranged such that rotation of the idler gear rotates the output gear.

3. The output transfer gear group according to claim 1, wherein the first coupler further includes:
   vi. a coupler housing, the bearing carrier rotatably supported within the coupler housing.

4. The output transfer gear group according to claim 3, wherein the coupler housing defines a chamber having an aperture communicating therewith, and the coupling mechanism includes a piston disposed within the chamber, the piston being reciprocally moveable over a range of travel between a first position and a second position, a rod extending through the aperture communicating with the chamber and having a first end and a second end, the first end of the rod connected to the piston, a fork connected to the second end of the rod, and the sliding collar operably arranged with the fork for movement of the sliding collar such that, when the piston is in the first position, the coupling mechanism is in the engaged position and the sliding collar is rotatively coupled with the hub, thereby rotatively coupling the hub and the bearing carrier, and such that, when the piston is in the second position, the coupling mechanism is in the disengaged position and the sliding collar is disengaged from the hub, and wherein the flow of hydraulic fluid controlled by the solenoid is in hydraulic communication with the chamber to selectively move the piston from the second position to the first position.

5. The output transfer gear group according to claim 4, wherein the fork is reciprocally mounted to the coupler housing, the fork includes a flange, the sliding collar includes a groove, the flange of the fork disposed within the groove of the sliding collar, and the flange and the groove are configured such that the sliding collar is rotationally movable with respect to the fork.

6. The output transfer gear group according to claim 4, further comprising:
   vii. a second solenoid adapted to control a flow of hydraulic fluid to selectively move the coupling mechanism from the engaged position to the disengaged position, and the second solenoid is in hydraulic communication with the chamber to selectively move the piston from the first position to the second position.

7. The output transfer gear group according to claim 4, wherein the fork includes a pair of walls in spaced relationship with each other, and further comprising:
   vii. a position sensor disposed between the walls of the fork, the position sensor operably arranged to sense the position of the walls when the piston is in at least one of the first position and the second position.

8. The output transfer gear group according to claim 1, wherein the coupling mechanism includes a detent mechanism for retaining the sliding collar in at least one of the engaged position and the disengaged position.

9. The output transfer gear group according to claim 8, wherein the sliding collar includes a plurality of first recesses arranged in a first circumferential row and a plurality of second recesses arranged in a second circumferential row, the bearing carrier includes a bore therein, the detent mechanism includes a plunger, a ball, and a spring, the plunger supporting the ball, the spring arranged with the bore and the plunger to urge the ball into retentive engagement with one of the first recesses of the sliding collar when the sliding collar is in the engaged position and into retentive engagement with one of the second recesses of the sliding collar when the sliding collar is in the disengaged position.

10. The output transfer gear group according to claim 1, further comprising:
    vi. a second solenoid adapted to control a flow of hydraulic fluid to selectively move the coupling mechanism from the engaged position to the disengaged position.

11. The output transfer gear group according to claim 1, further comprising:
    vi. a position sensor operably arranged with the coupling mechanism for sensing the position of the sliding collar of the coupling mechanism to detect when the coupling mechanism is in at least one of the engaged position and the disengaged position.

12. The output transfer gear group according to claim 1, further comprising:
    e. an auxiliary coupler, the auxiliary coupler including:
       i. an auxiliary hub, the auxiliary hub rotatively coupled with the transmission output shaft,
       ii. an auxiliary bearing carrier,
       iii. an auxiliary coupler output shaft supported within the auxiliary bearing carrier and rotatively coupled thereto, and
       iv. an auxiliary coupling mechanism, the auxiliary coupling mechanism engaged with the auxiliary bearing carrier, the auxiliary coupling mechanism movable between an engaged position, wherein the auxiliary coupling mechanism is engaged with the auxiliary hub such that rotation of the auxiliary hub rotates the auxiliary bearing carrier and the auxiliary coupler output shaft, and a disengaged position, wherein the auxiliary coupling mechanism is disengaged from the auxiliary hub; and
       v. an auxiliary solenoid adapted to control a flow of hydraulic fluid to selectively move the auxiliary coupling mechanism from the disengaged position to the engaged position.

13. The output transfer gear group according to claim 12, wherein the controller is electrically connected to the solenoid of the first coupler, the second solenoid of the second coupler, and the auxiliary solenoid of the auxiliary coupler, and the controller operable to prevent the auxiliary solenoid of the auxiliary coupler from moving the auxiliary coupling mechanism of the auxiliary coupler to the engaged position unless both the coupling mechanism of the first coupler and the second coupling mechanism of the second coupler are in the disengaged position.

14. An output transfer gear group comprising:
    a. a housing;
    b. a gear transfer train rotatably supported within the housing, the gear transfer train including an input gear adapted for enmeshing engagement with a transmission output shaft and a gear transfer output shaft, the gear transfer output shaft rotatable upon rotation of the input gear, the gear transfer output shaft having a distal end; and
    c. a coupler, the coupler including:
       i. a hub, the hub rotatively coupled with the distal end of the gear transfer output shaft,
       ii. a bearing carrier,
       iii. a coupler output shaft supported within the bearing carrier and rotatively coupled thereto,
       iv. a coupling mechanism, the coupling mechanism including a sliding collar rotatively coupled to the bearing carrier, the coupling mechanism movable between an engaged position, wherein the sliding collar of the coupling mechanism is rotatively coupled to the hub such that rotation of the hub rotates the sliding collar, the bearing carrier, and the coupler output shaft, and a disengaged position, wherein the coupling mechanism is disengaged from the hub,
       v. a solenoid adapted to control a flow of hydraulic fluid to selectively move the coupling mechanism from the disengaged position to the engaged position,
       vi. a coupler housing, the bearing carrier rotatably supported within the coupler housing, the coupler housing defining a chamber having an aperture communicating therewith, and
       vii. a position sensor,
    wherein the coupling mechanism includes a piston disposed within the chamber, the piston being reciprocally moveable over a range of travel between a first position and a second position, a rod extending through the aperture communicating with the chamber and having a first end and a second end, the first end of the rod connected to the piston, and a fork connected to the second end of the rod, the fork including a pair of walls in spaced relationship with each other,
    wherein the sliding collar is operably arranged with the fork for movement of the sliding collar such that, when the piston is in the first position, the coupling mechanism is in the engaged position and the sliding collar is rotatively coupled with the hub, thereby rotatively coupling the hub and the bearing carrier, and such that, when the piston is in the second position, the coupling mechanism is in the disengaged position and the sliding collar is disengaged from the hub,
    wherein the flow of hydraulic fluid controlled by the solenoid is in hydraulic communication with the chamber of the coupler housing to selectively move the piston from the second position to the first position, and
    wherein the position sensor is disposed between the walls of the fork, the position sensor being operably arranged to sense the position of the walls when the piston is in at least one of the first position and the second position.

15. An output transfer gear group comprising:
a. a housing;
b. a gear transfer train rotatably supported within the housing, the gear transfer train including an input gear adapted for enmeshing engagement with a transmission output shaft and a gear transfer output shaft, the gear transfer output shaft rotatable upon rotation of the input gear, the gear transfer output shaft having a distal end;
c. a coupler, the coupler including:
  i. a hub, the hub rotatively coupled with the distal end of the gear transfer output shaft,
  ii. a bearing carrier,
  iii. a coupler output shaft supported within the bearing carrier and rotatively coupled thereto,
  iv. a coupling mechanism, the coupling mechanism including a sliding collar rotatively coupled to the bearing carrier, the coupling mechanism movable between an engaged position, wherein the sliding collar of the coupling mechanism is rotatively coupled to the hub such that rotation of the hub rotates the sliding collar, the bearing carrier, and the coupler output shaft, and a disengaged position, wherein the coupling mechanism is disengaged from the hub, and
  v. a solenoid adapted to control a flow of hydraulic fluid to selectively move the coupling mechanism from the disengaged position to the engaged position;
d. an auxiliary coupler, the auxiliary coupler including:
  i. an auxiliary hub, the auxiliary hub rotatively coupled with the transmission output shaft,
  ii. an auxiliary bearing carrier,
  iii. an auxiliary coupler output shaft supported within the auxiliary bearing carrier and rotatively coupled thereto, and
  iv. an auxiliary coupling mechanism, the auxiliary coupling mechanism engaged with the auxiliary bearing carrier, the auxiliary coupling mechanism movable between an engaged position, wherein the auxiliary coupling mechanism is engaged with the auxiliary hub such that rotation of the auxiliary hub rotates the auxiliary bearing carrier and the auxiliary coupler output shaft, and a disengaged position, wherein the auxiliary coupling mechanism is disengaged from the auxiliary hub; and
  v. an auxiliary solenoid adapted to control a flow of hydraulic fluid to selectively move the auxiliary coupling mechanism from the disengaged position to the engaged position; and
e. a controller, the controller electrically connected to the solenoid of the first coupler and the auxiliary solenoid of the auxiliary coupler, the controller operable to prevent the auxiliary solenoid of the auxiliary coupler from moving the auxiliary coupling mechanism of the auxiliary coupler to the engaged position unless the coupling mechanism of the first coupler is in the disengaged position.

16. An output transfer gear group comprising:
a. a housing;
b. a gear transfer train rotatably supported within the housing, the gear transfer train including an input gear adapted for enmeshing engagement with a transmission output shaft and a gear transfer output shaft, the gear transfer output shaft rotatable upon rotation of the input gear, the gear transfer output shaft having a first distal end and a second distal end;
c. a first coupler, the first coupler including:
  i. a hub, the hub rotatively coupled with the first distal end of the gear transfer output shaft,
  ii. a bearing carrier,
  iii. a coupler output shaft supported within the bearing carrier and rotatively coupled thereto,
  iv. a coupling mechanism, the coupling mechanism including a sliding collar rotatively coupled to the bearing carrier, the coupling mechanism movable between an engaged position, wherein the sliding collar of the coupling mechanism is rotatively coupled to the hub such that rotation of the hub rotates the sliding collar, the bearing carrier, and the coupler output shaft, and a disengaged position, wherein the coupling mechanism is disengaged from the hub, and
  v. a solenoid adapted to control a flow of hydraulic fluid to selectively move the coupling mechanism from the disengaged position to the engaged position;
d. a second coupler, the second coupler including:
  i. a second hub, the second hub rotatively coupled with the second distal end of the gear transfer output shaft,
  ii. a second bearing carrier,
  iii. a second coupler output shaft supported within the second bearing carrier and rotatively coupled thereto, and
  iv. a second coupling mechanism, the second coupling mechanism engaged with the second bearing carrier, the second coupling mechanism movable between an engaged position, wherein the coupling mechanism is engaged with the second hub such that rotation of the second hub rotates the second bearing carrier and the second coupler output shaft, and a disengaged position, wherein the second coupling mechanism is disengaged from the second hub; and
  v. an engage solenoid adapted to control a flow of hydraulic fluid to selectively move the second coupling mechanism from the disengaged position to the engaged position; and
e. an auxiliary coupler, the auxiliary coupler including:
  i. an auxiliary hub, the auxiliary hub rotatively coupled with the transmission output shaft,
  ii. an auxiliary bearing carrier,
  iii. an auxiliary coupler output shaft supported within the auxiliary bearing carrier and rotatively coupled thereto, and
  iv. an auxiliary coupling mechanism, the auxiliary coupling mechanism engaged with the auxiliary bearing carrier, the auxiliary coupling mechanism movable between an engaged position, wherein the auxiliary coupling mechanism is engaged with the auxiliary hub such that rotation of the auxiliary hub rotates the auxiliary bearing carrier and the auxiliary coupler output shaft, and a disengaged position, wherein the auxiliary coupling mechanism is disengaged from the auxiliary hub; and
  v. an auxiliary solenoid adapted to control a flow of hydraulic fluid to selectively move the auxiliary coupling mechanism from the disengaged position to the engaged position.

* * * * *